Dec. 20, 1955  A. W. DUNN  2,727,258
SHOE LASTING MACHINE
Filed July 22, 1948  11 Sheets-Sheet 2
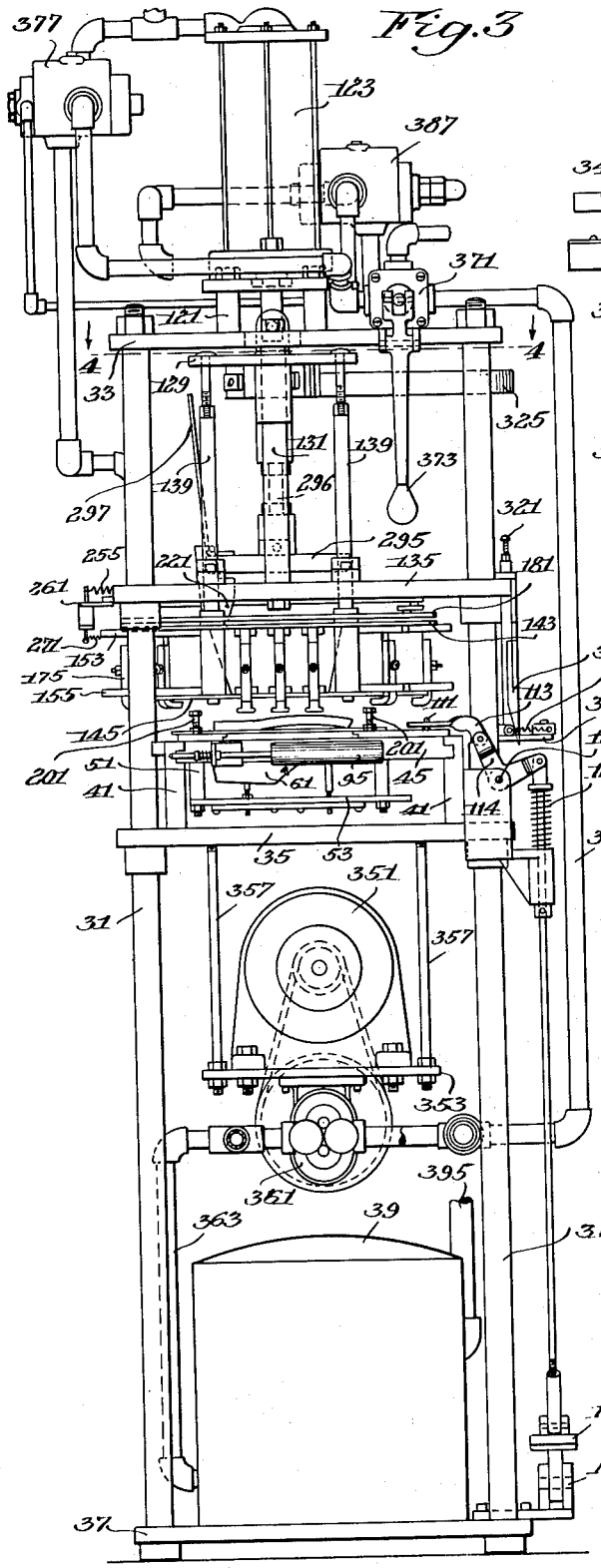
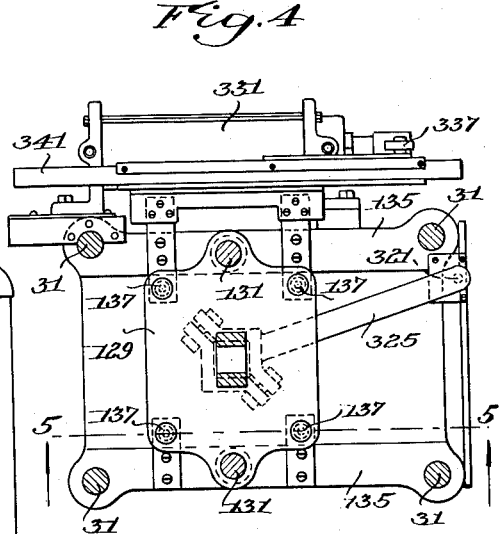
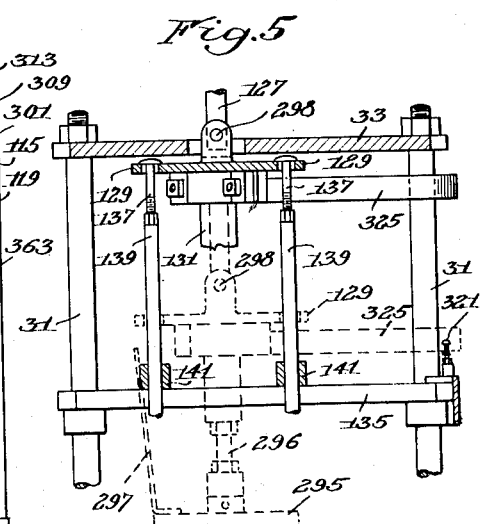
INVENTOR.
Alfred W. Dunn
BY Charles Shepard
his Attorney Dec. 20, 1955  A. W. DUNN  2,727,258
SHOE LASTING MACHINE
Filed July 22, 1948   11 Sheets-Sheet 5

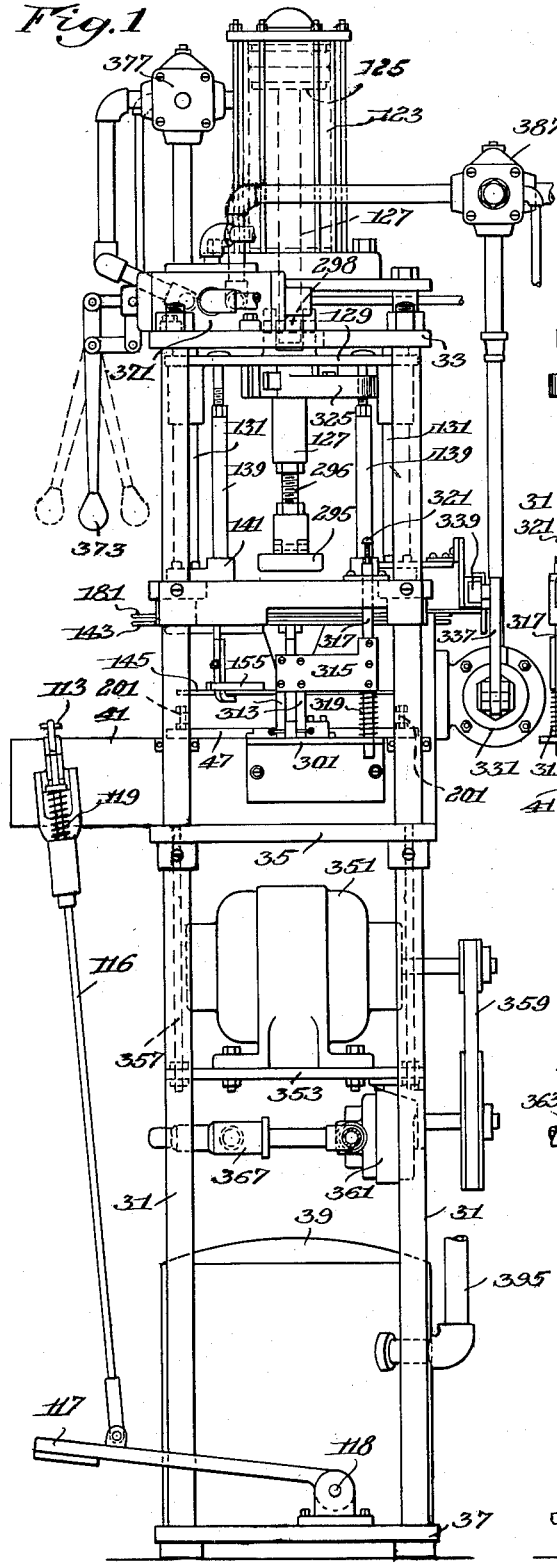

INVENTOR.
Alfred W. Dunn
BY Charles Shepard
his Attorney

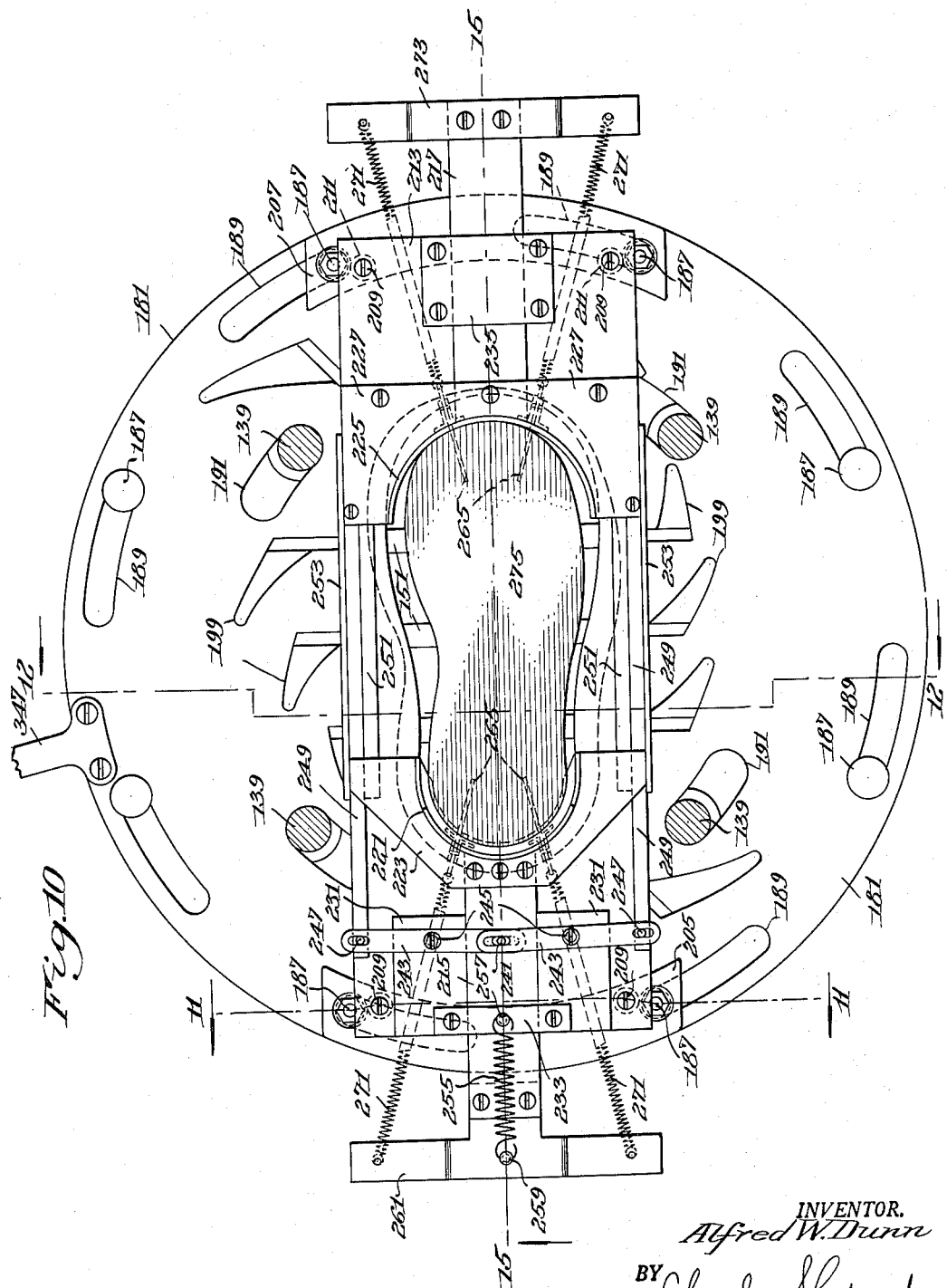

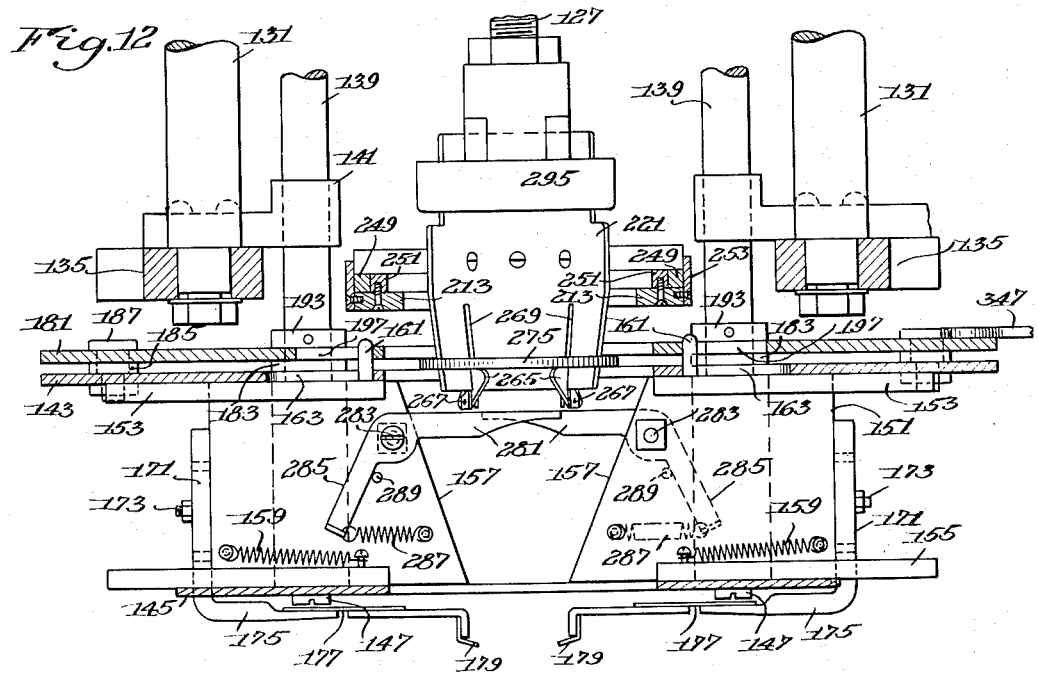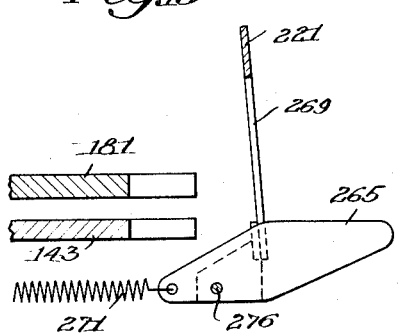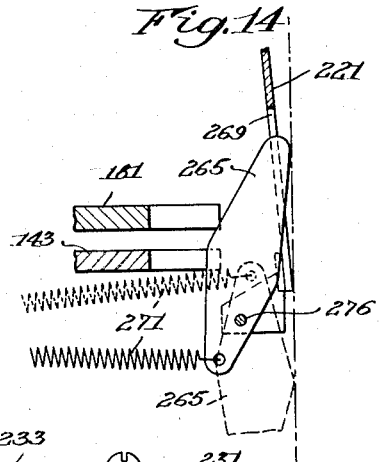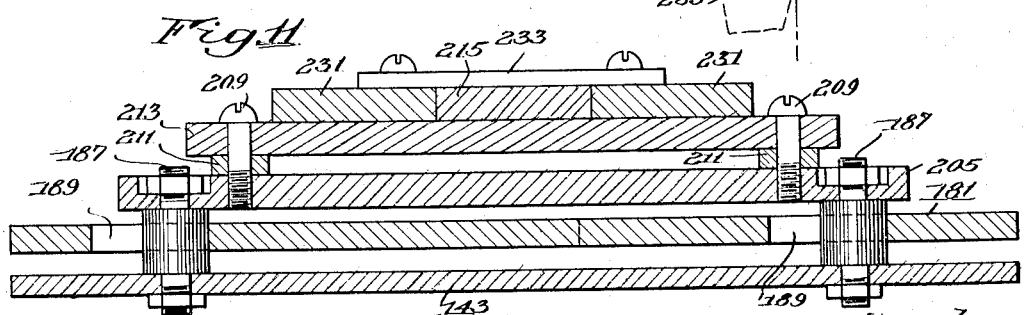

Dec. 20, 1955         A. W. DUNN         2,727,258
SHOE LASTING MACHINE
Filed July 22, 1948         11 Sheets-Sheet 8
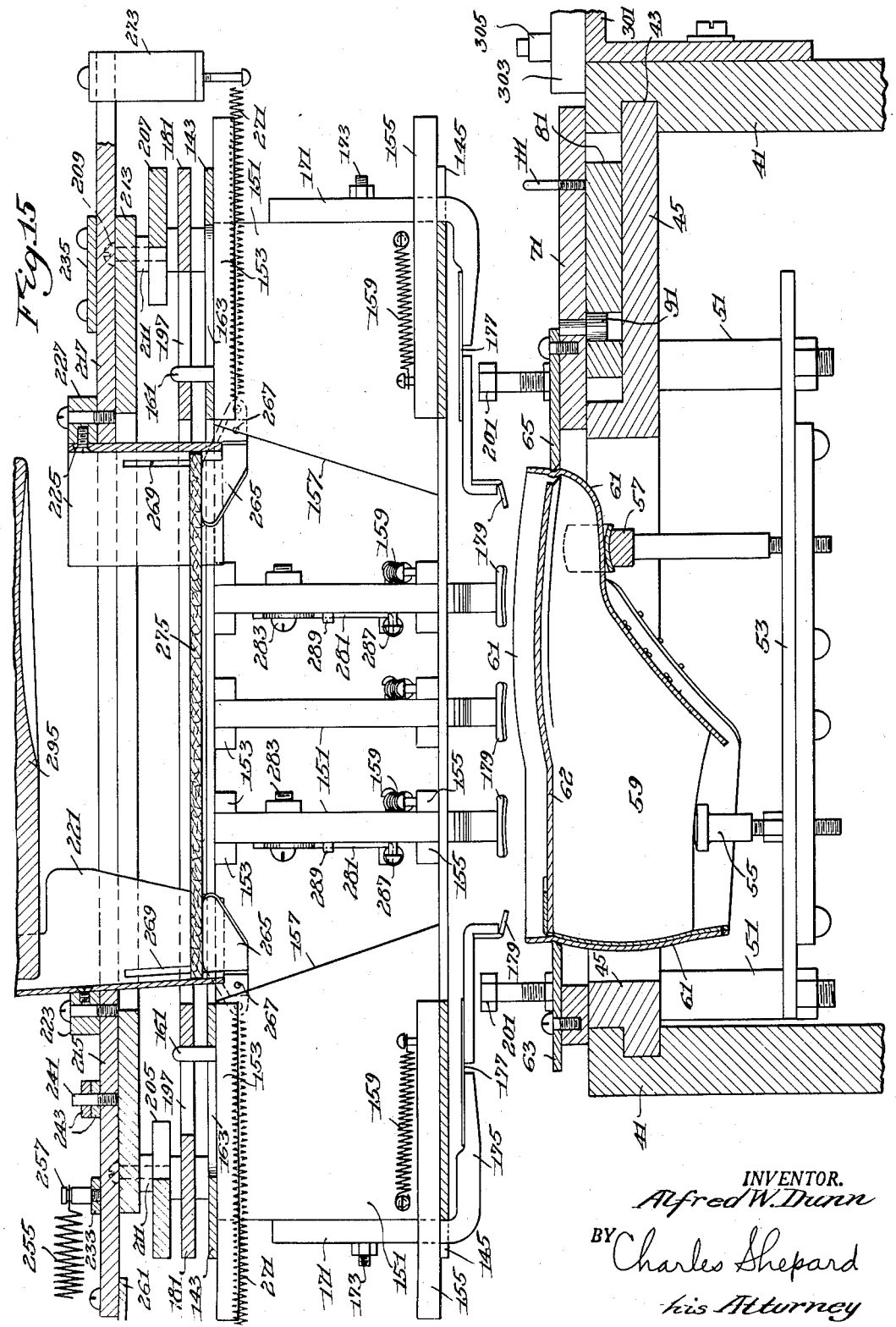
INVENTOR.
Alfred W. Dunn
BY Charles Shepard
his Attorney Dec. 20, 1955  A. W. DUNN  2,727,258
SHOE LASTING MACHINE
Filed July 22, 1948  11 Sheets-Sheet 9
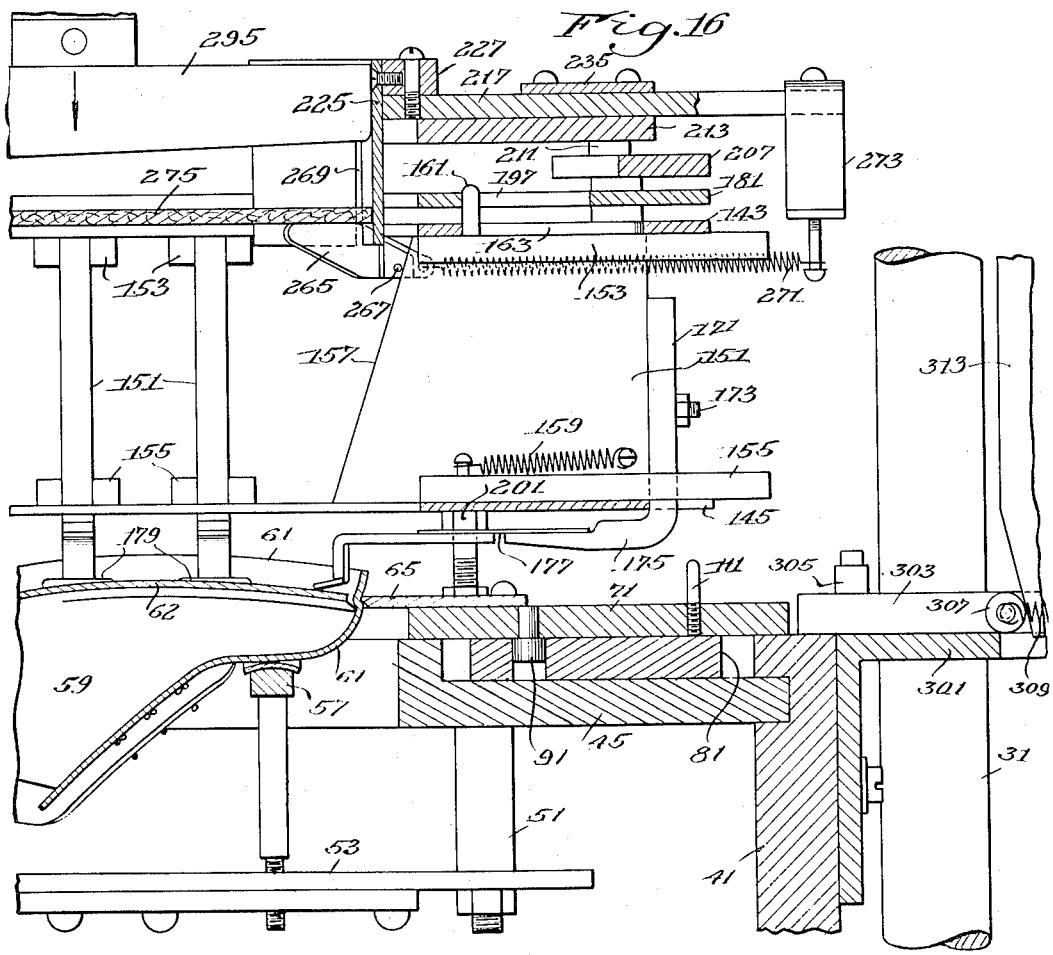
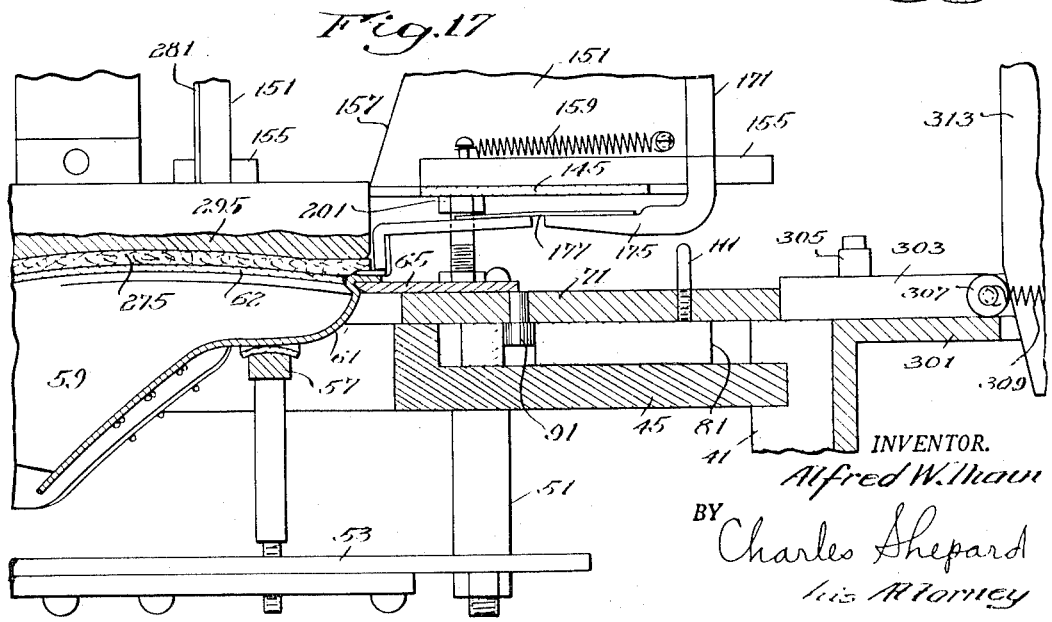
INVENTOR.
Alfred W. Dunn
BY Charles Shepard
his Attorney Dec. 20, 1955 A. W. DUNN 2,727,258
SHOE LASTING MACHINE
Filed July 22, 1948 11 Sheets-Sheet 10

INVENTOR.
Alfred W. Dunn
BY Charles Shepard
his Attorney

Dec. 20, 1955 A. W. DUNN 2,727,258
SHOE LASTING MACHINE
Filed July 22, 1948 11 Sheets-Sheet 11
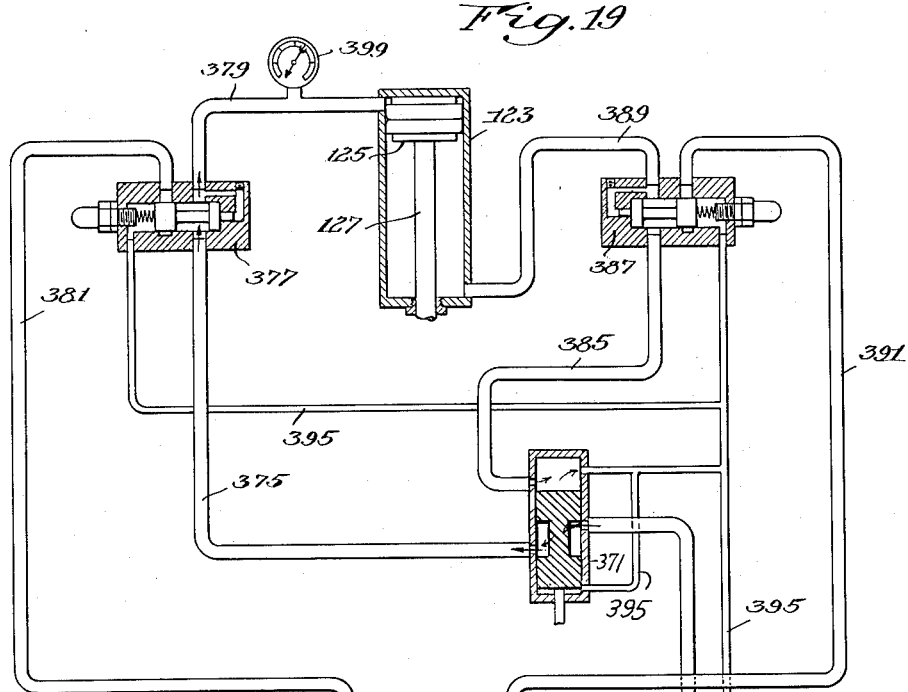
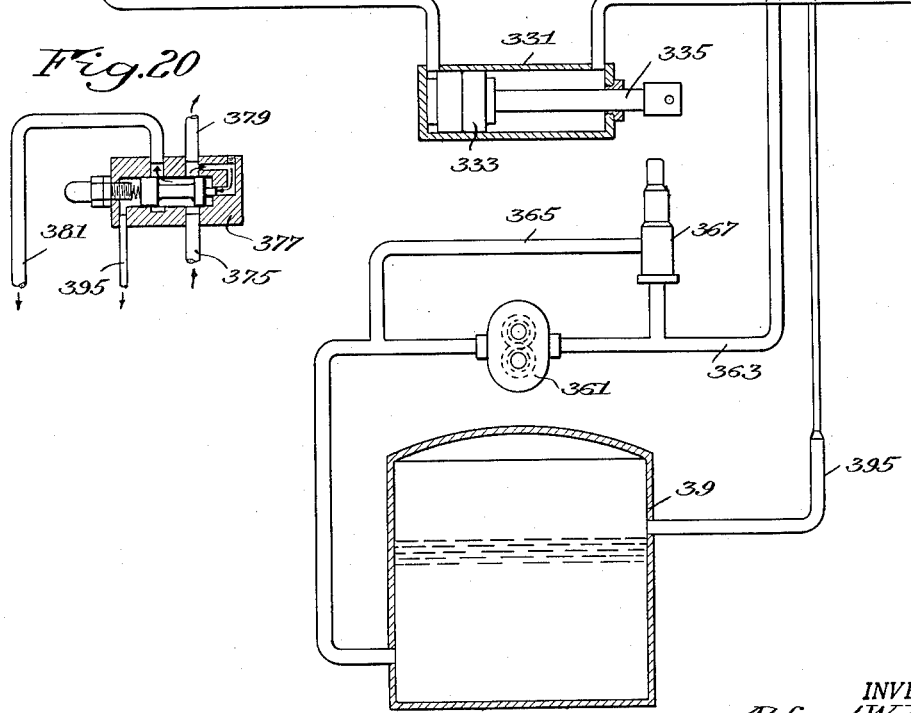
INVENTOR.
Alfred W. Dunn
BY Charles Shepard
his Attorney United States Patent Office 2,727,258
Patented Dec. 20, 1955

2,727,258

SHOE LASTING MACHINE

Alfred W. Dunn, Rochester, N. Y., assignor, by direct and mesne assignments, of one-half to Charles Shepard, Rochester, N. Y.; Bessie K. Dunn, executrix of said Alfred W. Dunn, deceased, assignor of one-half to herself, individually Application July 22, 1948, Serial No. 40,046

28 Claims. (Cl. 12—7.5)

This invention relates to shoemaking apparatus, and more particularly to a shoe lasting and sole placing machine. One of the objects of the present invention is to provide a generally improved and more satisfactory machine of this character.

Another object is the provision of a machine of semi-automatic character, in which manually controlled operations are reduced to a minimum, and in which, when once set into operation, the machine will automatically perform a predetermined sequence of operations.

Still another object of the invention is the provision of a machine which is especially adapted to and useful in the manufacture of shoes of the stitch-down variety, although not limited in its usefulness to shoes of this kind.

A further object is the provision of a machine which, with a minimum of effort on the part of the operator, will quickly last a shoe of the stitch-down variety, stretching the upper smoothly and uniformly over the last, and turning outwardly and holding down the marginal edge of the upper, and will then apply a sole to the upper, in accurately predetermined position with respect to the lasted upper.

These and other desirable objects are accomplished by the construction disclosed as an illustrative embodiment of the invention in the following description and in the accompanying drawings forming a part hereof, in which:

Fig. 1 is a side elevation of a machine embodying a preferred form of the invention, viewed from the right-hand side;

Fig. 2 is a rear elevation thereof;

Fig. 3 is a front elevation thereof;

Fig. 4 is a horizontal section taken substantially on the line 4—4 of Fig. 3;

Fig. 5 is a fragmentary vertical section taken substantially on the line 5—5 of Fig. 4;

Fig. 10 is a plan of the sole hopper and associated parts, with overlying structure omitted for the sake of clarity;

Fig. 11 is a vertical section taken substantially on the line 11—11 of Fig. 10;

Fig. 12 is a vertical section through the sole hopper and associated parts, the section being taken approximately on the line 12—12 of Figs. 6 and 10;

Fig. 13 is a fragmentary vertical section through one end of the sole hopper, illustrating the sole-supporting finger or dog in normal position;

Fig. 14 is a view similar to Fig. 13, illustrating the pivoting action of the finger in various stages of operation of the machine;

Fig. 15 is a vertical section through the sole hopper, spreading finger mechanism, and vise, showing the parts in the initial position ready to begin a lasting operation, the section being taken substantially on the line 15—15 of Figs. 6 and 10 except that the vise, shown in its forward position in Fig. 6, is illustrated in Fig. 15 in its rearward position under the spreading fingers;

Fig. 16 is a view similar to a fragment of Fig. 15, illustrating the next position of the parts, with the spreading fingers brought down to bear on the last, ready to begin their outward motion;

Fig. 17 is a view similar to Fig. 16, showing the next step, with the spreading fingers moved outwardly to turn out the marginal edge of the upper, and with the sole placed thereon but not yet completely laid;

Fig. 19 is a diagrammatic view illustrating the hydraulic control system of the machine; and Fig. 20 is a view of that part of the hydraulic circuit shown at the upper left corner of Fig. 19, illustrating one of the control valves in a different position.

The same reference numerals indicate the same parts throughout the several views.

Figure 6:
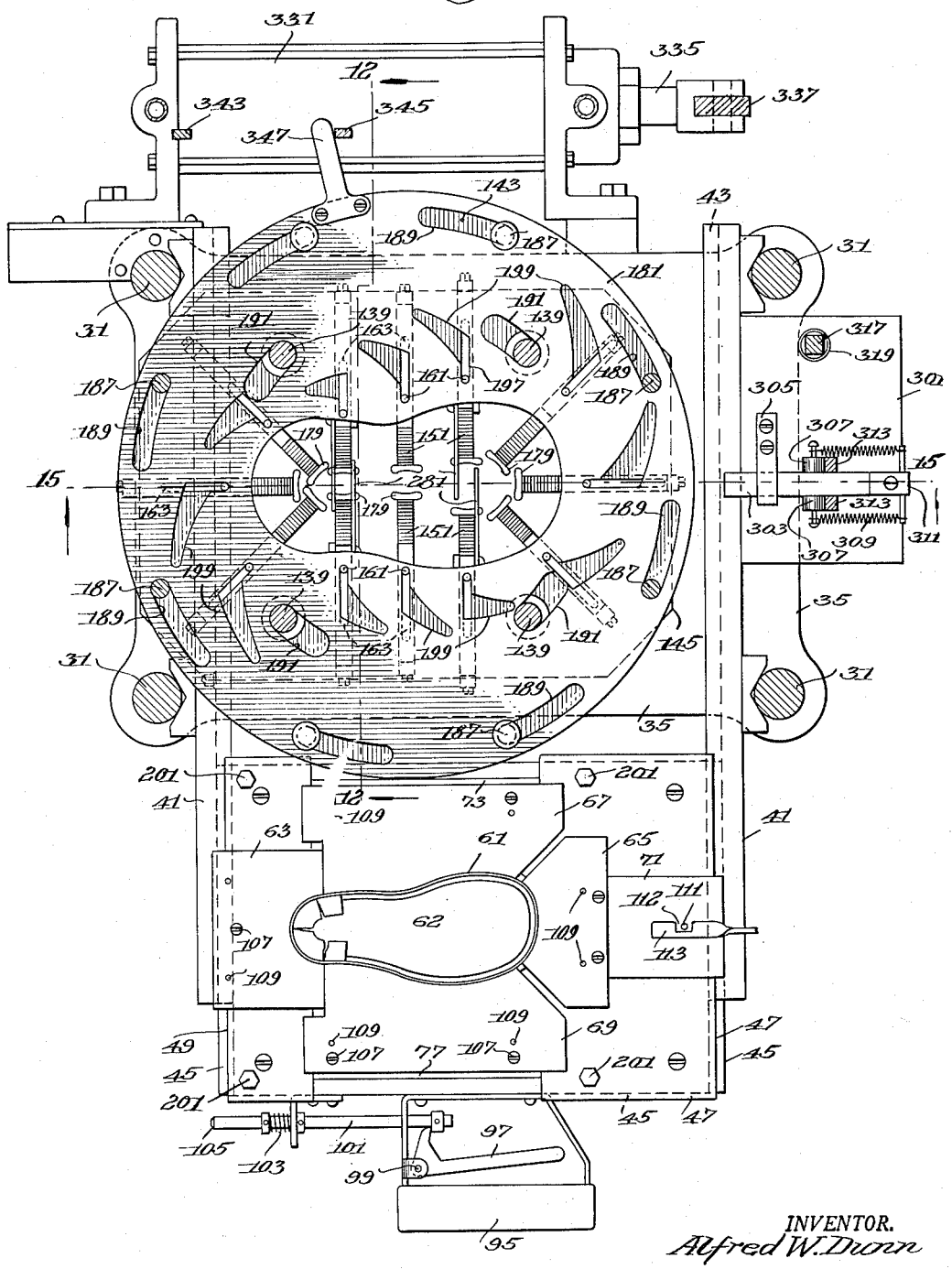
Fig. 6 is a plan (with parts in horizontal section) of part of the machine, showing the last-holding vise in its forward or loading position, and showing the spreading fingers in their innermost or initial position, with the control cam also in its initial position.

To give first a general summary or outline of the operation of the machine, it may be said that the machine comprises a vise or clamping arrangement mounted on a carriage which reciprocates forwardly and rearwardly. When the clamp or vise is in its forward position, the operator steps on a treadle to open the vise and then loads it with a shoe upper having a last loosely inserted in the upper, and an insole on the last. Upon releasing foot pressure from the treadle, the clamping parts of the vise are automatically closed by springs, to draw the upper easily over the last, which last is, as usual in most shoemaking operations, in inverted position with the "bottom" or sole surface of the last really forming its top when in this inverted position.

When the treadle has been released so that the vise has closed to clamp the last and upper and to draw the upper lightly or easily on the last, the operator pushes the carriage from the loading position rearwardly to the lasting position. This rearward movement of the carriage brings the vise or clamping mechanism to a position located centrally under the spreading fingers and the sole hopper. Actuation of a suitable control member then initiates the automatic part of the cycle of the machine, first causing the spreading fingers to descend into a position resting on the insole which has been placed on the upper surface of the last (this being the "bottom" of the last in its inverted position); then causing the spreading fingers, while pressing down on the insole and the last, to draw outwardly in a plurality of directions approximately radial with respect to the outline of the sole, so as to turn down, in an outward direction, the marginal edge of the shoe upper, and draw it outwardly; then the sole-placing plunger descends, carrying down with it a sole previously placed in the sole hopper and having cement applied thereto, this plunger serving to force the sole, with moderate pressure, against the insole and the out-turned marginal edges of the upper while such marginal edges are still being held by the spreading fingers; and then the spreading fingers are quickly withdrawn outwardly from the marginal edges of the upper (and from an underlying position with relation to the sole) and simultaneously therewith the pressure on the clamping plates or lasting plates of the vise is increased to perform the final lasting step of tightly pulling the shoe upper very snugly on the last, and the pressure on the sole-placing plunger is likewise increased to the final sole-placing pressure of greater magnitude. Then the plunger moves upwardly again, the last part of the upward movement carrying with it the spreading fingers to raise them from the shoe, after which the spreading fingers are restored inwardly to their initial position close to the center of the shoe sole, but above it. The carriage on which the vise or clamping mechanism is mounted may now be pulled forwardly toward the operator, to a readily accessible or loading position, whereupon the operator may step on the treadle which releases the clamps so that the last with the lasted and soled shoe thereon may be removed, and another last with an upper loosely fitted thereon may be placed in the vise. Before or after this, the sole hopper may be reloaded with another sole. The parts are then ready for another cycle of operation, to last the upper on the last which has just been placed in the clamping means or vise, and to place the sole thereon.

Most of the movements of the mechanism, in its preferred form, are automatically accomplished in predetermined timed sequence by power means such as hydraulic means, although it may be understood that pneumatic means or other power means may be employed if desired. Pneumatic power means is quite satisfactory in practice (although hydraulic means is preferred at present) and the term "fluid pressure means" as used hereafter is intended to cover pneumatic power means as well as the preferred hydraulic power means.

Turning now to the description of the machine in more detail, and referring first to the general views constituting Figs. 1–3, the machine comprises a stationary frame including four upright posts 31 rigidly connected to each other by various cross members including a top plate 33, an intermediate plate or shelf 35, and a bottom plate 37 which supports the fluid pressure tank or reservoir 39. The operator stands or sits at one side of the machine, and for convenience of description this side at which the operator is located will be called the front of the machine. The front of the machine is the side shown in Fig. 3, and is the side to the left of Fig. 1. The side which is to the operator's right when the operator faces the machine, will be called the right side of the machine, and the side which is to the operator's left will be called the left side of the machine, and the right and left sides of the machine appear, accordingly, at the right and left, respectively, of Fig. 3. The side of the machine which is most remote from the operator will be called the back or rear of the machine, and is the side illustrated in Fig. 2. These terms, front, rear, right, and left are, of course, chosen merely for convenience of description, and it will be readily understood that the machine may be oriented in any desired way without departing from the principles of the invention.

Mounted on the transverse shelf 35 are a pair of guide rails 41 which project forwardly to a substantial extent at the front of the machine, as indicated in Figs. 1 and 6. The inwardly faced surfaces of these rails 41 carry, near their upper edges, horizontal grooves 43 constituting guideways which receive the lateral edges of a carriage plate 45 to which are attached, in turn, other plates 47 and 48 at the right, and 49 at the left in overlying relation to the rails 41 and the main carriage plate 45.

This carriage, comprising mainly the plates 45, 47, 48, and 49, slides back and forth horizontally on the rails 41. In its forward position (Fig. 6), closest to the operator, it is in a convenient location for loading an unlasted shoe on the carriage or unloading a lasted shoe from it. In its rear position (Figs. 1 and 15), farthest away from the operator, it is located approximately centrally between the four columns 31 of the frame of the machine, approximately vertically alined with the spreading fingers, the sole hopper, and the sole laying plunger, which will be described hereafter.

At the center of the carriage is an opening large enough to accommodate the largest sized shoe which this machine is designed to make. Straps 51 (Fig. 15) depending from the carriage plate 45 supports a shelf 53 on which is mounted the usual last supporting pin 55 and toe rest 57, both vertically adjustable as indicated in Fig. 15. The last 59, carrying the shoe upper 61 loosely placed thereon, and usually carrying also an insole 62, is mounted on the pin 55 with the toe of the upper resting on the toe rest 57. The elevations of the pin 55 and the toe rest 57 are so adjusted that the bottom of the last (that is, the sole portion thereof, which is the upper edge when placed in the inverted position of Fig. 15) comes approximately at the height of the top faces of the plates 47, 48, and 49.

Mounted on the carriage is a set of clamping and lasting plates comprising a heel plate 63 (Fig. 6) a toe plate 65, and side plates 67 and 69. Preferably three of these plates are movable and the fourth is fixed, but all four may be movable if desired. In the preferred embodiment, the heel plate 63 is fixed in position on the stationary plate 49 of the carriage, and the toe plate 65 is fastened to a slide 71 which is mounted for sliding movement toward and away from the toe of the shoe, in a direction rightwardly and leftwardly of the carriage, between the two plates 47 and 48, both of which are dovetailed or undercut to provide a guideway for the slide 71.

Figure 7:
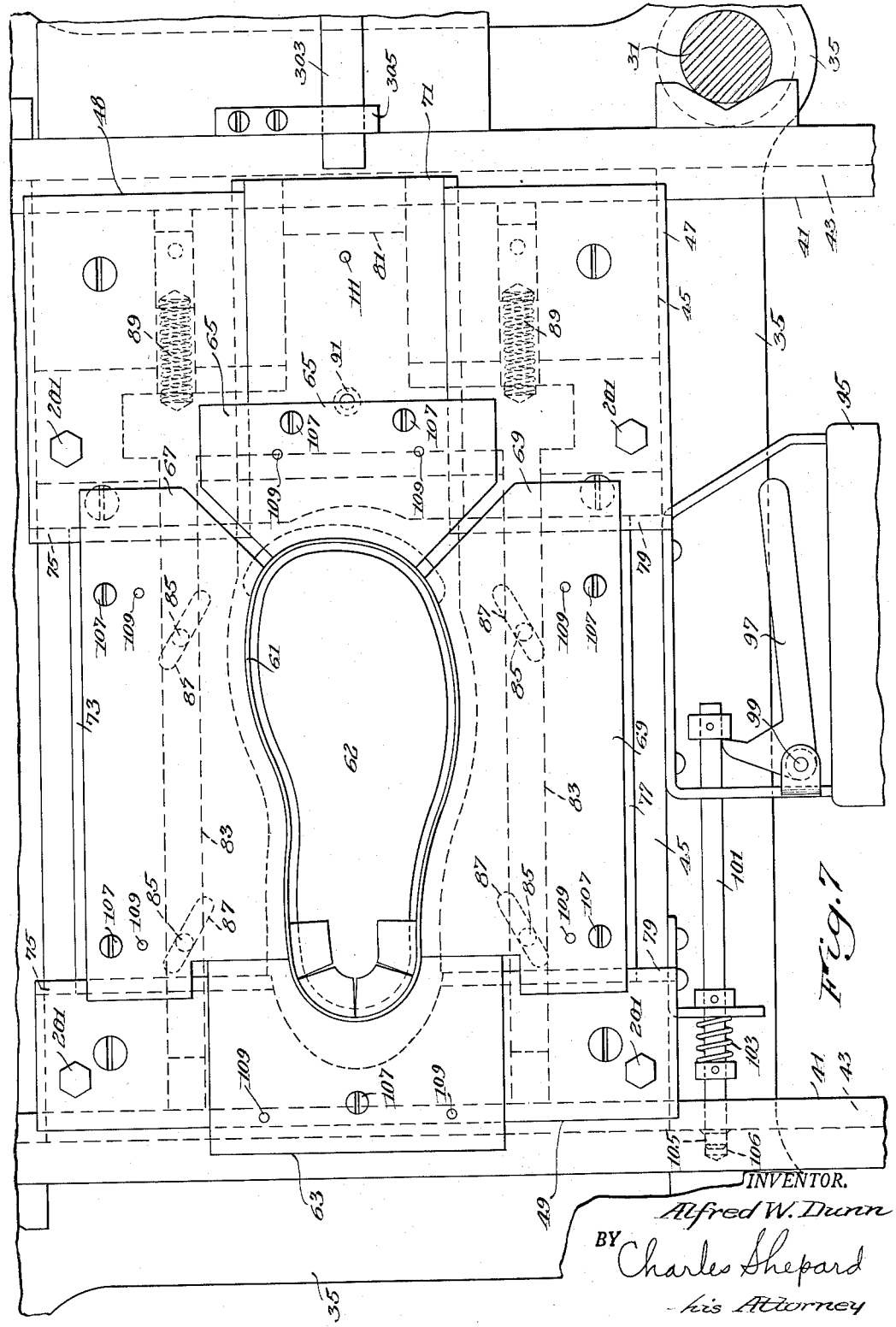
Fig. 7 is a plan of the lasting vise, on a larger scale than Fig. 6 and showing additional details, the vise being here illustrated in its rearward or lasting position, but with overlying structure omitted.

The side clamping plate 67 at the rear of the carriage is mounted on a slide member 73 (Figs. 6 and 7) movable forwardly and backwardly on the carriage in guideways 75 formed in the edges of the plates 48 and 49. The other side clamping plate 69 at the front of the carriage is similarly mounted on a slide 77 movable forwardly and rearwardly on the carriage in guideways 79 formed in the plates 47 and 49. In a suitable recess formed in the main carriage plate 45, there is a lateral slide 81 (Figs. 7 and 15) which extends from the region of the toe of the shoe toward the right of the carriage, and which also has two arms 83 extending leftwardly from the toe region in straddling relation to the shoe. These arms 83 each have upstanding pins 85 (Fig. 7) extending into inclined slots 87 formed in the slide plates 73 and 77 on which the clamping plates 67 and 69 are mounted. Coiled compression springs 89 press rightwardly against fixed parts of the carriage plate 45 and press leftwardly against portions of the slide 81, thus constantly tending to move the slide 81 leftwardly across the carriage, but with only slight force. Such leftward movement, through the action of the pins 85 on the slots 87, will serve to move the slide members 73 and 77 together with their clamping plates 67 and 69 toward the center line of the shoe. At the same time, the leftward movement of the slide 81 will be transmitted through a pin 91 (Figs. 7 and 15) to the slide 71 on which the toe clamping plate 65 is mounted, and thus will move the toe clamping plate 65 against the toe of the shoe. These clamping plates, as seen in Fig. 15, have their inner edges beveled on their lower corners and are at an elevation substantially level with the sole of the last, so that as the clamping plates move in toward the center of the shoe, they will tend to pull the shoe upper over the sole edge of the last and tighten the upper firmly on the last. When the slide plate 71 is pulled rightwardly by mechanism hereafter described, this will pull the toe clamping plate 65 away from the toe of the shoe, and the rightward motion will be transmitted through the pin 91 to the slide 81, which will move rightwardly against the force of the springs 89 and, through the pins 85 acting on the cam slots 87, will spread the side clamping plates 67 and 69 away from the shoe.

At the front of the carriage is a handle 95 (Figs. 6 and 7) conveniently placed to be grasped by the operator to move the carriage forwardly or rearwardly. A latch lever 97 pivoted at 99 just rearwardly of the handle 95 cooperates with a rod 101 to pull it rightwardly against the force of its spring 103, to retract the latching end 105 of the rod from its latching notch 106 in the lefthand one of the guide rails 41, when the carriage is in its rear position, so that it may be moved forwardly.

The clamping and lasting plates 63, 65, 67, and 69 are readily and quickly detachable from the underlying plates on which they are mounted, by removing the holding screws 107. The clamping plates are held in accurate position on the underlying plates not only by these screws but also by dowel pins 109. One set of plates 63—69 serves for a given size of shoe of a given style. For any other style of shoe, or for any other size of the same style, the plates 63—69 are removed, and are replaced by another set of plates of the proper outline or configuration for the next size and style of shoe which is to be manufactured on the machine. Also a separate set of plates is used for a right foot shoe and a left foot shoe of the same size and style, the present machine being arranged to make only a right foot shoe or a left foot shoe at a time, but not both. Two similar machines may be set up next to each other for making the right and left shoes constituting a single pair, or all of the right shoes of the given size and style may be made and then the plates may be changed and the left shoes may be run through the same machine.

When the carriage is at the forward limit of its travel, a pin 111 (Fig. 6) on the slide 71 lies in a rearwardly faced notch 112 in a link 113 which is pivoted to a bellcrank lever 114 (Fig. 3) pivoted at 115 on the frame of the machine. The other arm of the bellcrank lever is connected to a downwardly extending rod 116 connected at its lower end to a treadle 117 (Figs. 1 and 3) pivoted at 118 on the frame of the machine. A spring 119 thrusts upwardly on the rod 116 and tends to keep the treadle and the rod in elevated position and to keep the link 113 in its leftward position, so that the notch 112 is ready to receive the pin 111 as the carriage moves forward. With the carriage in its forward position, the operator steps on the treadle 117, which moves the link 113 rightwardly, pulling rightwardly on the pin 111 and the slide member 71 to open the clamping or lasting plates 65, 67, and 69, ready for removal of the lasted shoe and insertion of another shoe to be lasted. When the shoe has been placed in position, the operator releases foot pressure on the treadle 117 so that the spring 119 restores the link 113 leftwardly, allowing the springs 89 (Fig. 7) to close the clamping plates 65, 67, and 69 on the shoe upper. Then as the carriage moves rearwardly, the pin 111 simply moves out of the open or rear side of the notch 112.

When the carriage is moved to the rearward limit of its travel, the end 105 of the latching bar snaps into the latching recess 106 (Fig. 7) in the rail 41, thus latching the carriage in its rearward position until it is released by the latch control lever 97. In this rearward position of the carriage, the last and the upper carried thereby are properly centered directly beneath a series of spreading fingers and a hopper for containing the sole to be laid on the shoe. These parts will now be described.

Referring now to Figs. 1–3, rigidly mounted on the top plate 33 of the machine, by means of posts 121, is a vertically arranged hydraulic cylinder 123 containing a piston 125 and a piston rod 127 extending downwardly through the bottom of the cylinder, through a suitable gland or stuffing box. The piston rod passes through an opening in the top plate 33 of the apparatus, and at an elevation slightly below this top plate 33 when the piston rod is in its uppermost position, it carries a plate 129 (see also Figs. 4 and 5) which is arranged approximately horizontally and is suitably fixed to the piston rod 127 to move upwardly and downwardly with it. As best seen in Fig. 4, the front and rear edges of the plate 129 are extended forwardly and rearwardly respectively, to encircle and slide on and be guided by two stationary vertical rods 131, the upper end of each rod being fixed to the main top plate 33 of the machine, and the lower end of each rod being fixed to a stationary cross piece 135 which is mounted on and rigidly secured to the upright posts 31.

Near the four corners of the plate 129 are holes through which four studs 137 extend, the studs having enlarged heads overlying the plate 129 and having lower ends threaded into vertical rods 139 which are slidable vertically in guiding brackets 141 (Figs. 5 and 12) mounted in fixed location on the cross bars 135 above mentioned. The studs 137 pass loosely through the holes in the plate 129 so that there is a lost motion connection, and the plate 129 with the piston rod 127 may continue moving downwardly after the downward motion of the studs 137 and rods 139 ceases.

Near their lower ends, the rods 139 are of enlarged diameter compared to their upper ends, as best seen in Figs. 3 and 12, thus forming shoulders supporting a horizontal plate 143 apertured to encircle each rod 139. Another horizontal plate 145 underlies the lower ends of the rods 139 and is secured thereto by the screws 147, one threaded into the lower end of each rod. The plates 143 and 145 are provided with central apertures somewhat larger than the sole of the largest shoe which is intended to be made on this machine.

Figure 8:
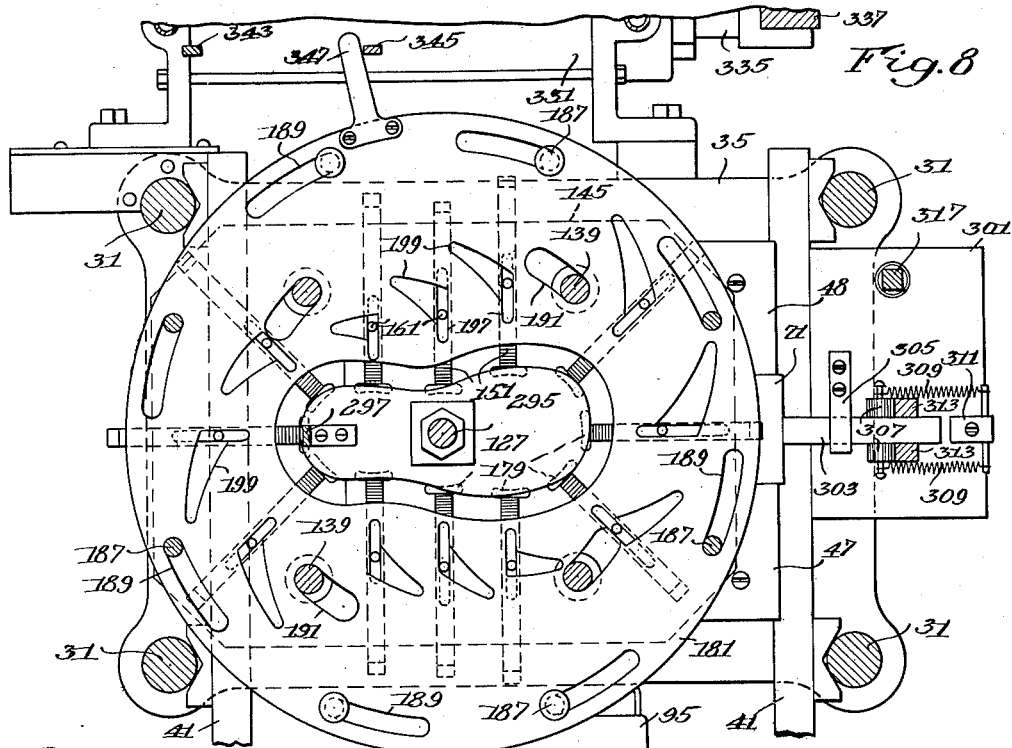
Fig. 8 is a view similar to a portion of Fig. 6, showing the spreading fingers moved somewhat outwardly, in an intermediate stage of a spreading operation, but with the control cam of the spreading fingers still in its initial position.

A series of spreader slides are mounted for horizontal sliding movement between the upper plate 143 and the lower plate 145, in directions roughly perpendicular to the outline of the shoe sole, the slides preferably being in the form of thick plates 151 (Figs. 6 and 15) arranged in vertical planes, having their bottom edges resting on and guided by the bottom plate 145, their top edges sliding against and guided by the top plate 143, and being laterally guided by side strips 153 screwed or welded on the bottom face of the plate 143 on each side of each slide 151, and similar strips 155 similarly secured to the top face of the bottom plate 145 on each side of each slide 151. Any desired number of such slides 151 may be employed, depending upon the size and shape of the shoe sole. For manufacturing most children's shoes, it is found convenient to employ twelve of these slides arranged, as seen in Figs. 6 and 8, with three slides parallel to each other along one side edge of the sole, three other slides parallel to each other along the opposite side edge of the sole, three slides at an angle to each other at the toe portion of the sole, and three other slides at an angle to each other at the heel portion of the sole.

Each of these slides 151 has its inner end cut obliquely to form a cam surface as indicated at 157 (Figs. 12 and 15). As the sole of the shoe comes down during the sole laying operation as described hereafter, the edges of the sole come into contact with the oblique cam surfaces 157 and move all of the slides 157 outwardly away from the center of the sole, against the force of light springs 159 which constantly tend to move the slides 151 inwardly toward the center of the sole, as far as permitted by a pin 161 fixed to the top of each slide 151 engaging the inner end of a slot 163 in the plate 143. This determines the innermost position to which the springs 159 can move the slides.

Mounted on each spreader slide 151 at the outer end thereof is a bracket 171 secured to the slide by any suitable means such as a screw 173, which bracket extends downwardly past the outer edge of the plate 145 to an elevation below the plate, and thence extends horizontally inwardly at 175 toward the center of the sole of the shoe, in the same vertical plane with the slide 151 to which it is attached. A portion of the horizontal reach 175 of each bracket 171 is made flexible and resilient, either by suitably thinning the metal, or preferably by cutting out a portion of the main metal bar and inserting a resilient metal spring strip 177 as seen in Fig. 15. Beyond the flexible resilient portion, the arm 175 is bent downwardly and then is provided with a broadened foot portion 179 of flexible resilient material such as spring steel. The portion 179 extends a short distance inwardly toward the center of the shoe sole, and at a slight angle downwardly, as seen in Fig. 15. The downwardly extending portions of the inner ends of the horizontal arms 175 are approximately in vertical alinement with the inner ends of the oblique cam portions 157, and the resilient feet 179 extend slightly inwardly beyond the inner ends of these cam portions 157, as seen in Figs. 12 and 15. These arms 175 and resilient feet 179 constitute spreading fingers for spreading in an outward direction the upstanding marginal edges of the shoe upper, to turn those marginal edges outwardly and downwardly ready for the placing of the sole, when making shoes of the stitch-down type.

A rotary cam plate 181 (Figs. 6, 8, 9, 12, and 15) is mounted horizontally just above the plate 143, and spaced slightly upwardly therefrom by means of washers 183 on the posts 139, and also washers 185 on studs 187 fixed in the plate 143 and passing through arcuate slots 189 in the cam plate 181. This cam plate also has arcuate slots 191 through which the posts 139 extend. Collars 193 pinned to the posts 139 just above the cam plate 181 serve to hold the cam plate down against the washers 183 and 185 and thus serve to hold the plate 143 against its supporting shoulders on the rods 139.

This cam plate 181, as best seen in Fig. 6, is provided with slots 197 receiving the pins 161 which extend upwardly from the slides 151 through the slots 163 in the plate 143. These slots 197 are arranged so that when the cam plate is in its normal initial position as shown in Figs. 6 and 8, the inner ends of the slots 197 are parallel to the directions in which the respective slides 151 move; in other words, they lie in the vertical planes of the spreader slide plates 151. Somewhat outwardly from the inner ends of these slots 197, however, the slots are extended laterally to form oblique cam surfaces 199 effective, when the cam plate 181 is moved in a clockwise direction from the initial position shown in Figs. 6 and 8 to the operated position shown in Fig. 9, to act on the pins 161 and cam them outwardly, drawing the slide plates 151 and the spreading fingers 175, 179 somewhat further outwardly. The purpose of this is to withdraw the feet 179 completely from the marginal edge of the shoe upper, in the final stages of the sole laying operation, as will be explained in greater detail below.

The plates 143 and 145, the cam disk 181, the spreader slide members 151, and the spreading fingers 175, 179 all move upwardly and downwardly as a unit, with the upward and downward movements of the rods 139 on which they are mounted. When the piston rod 127 and the plate 129 are at the upward limit of their travel, the plate, by its action on the heads of the bolts 137, raises the rods 139 so that the spreading feet 179 are at an elevation approximately an inch above the sole portion of the last. During the early stages of a sole placing cycle of operation, the piston rod 127 and plate 129 move downwardly, thus allowing the rods 139 to drop by gravity until the spreading feet 179 rest on the last, or rather on the insole 62 which has previously been placed on the last, at which time further downward movement of the rods 139 and the parts carried thereby is stopped by contact of the plate 145 with the heads of supporting studs 201 adjustably screwed into suitable parts of the last carriage, such as the parts 47, 48, and 49, and held in adjusted position by lock nuts. But the piston rod 127 may continue to move further downwardly because of the lost motion connection between the plate 129 and the rods 139, as already mentioned. In addition to the plates 143 and 145, the cam disk 181, and the slide members 151, etc., there is also mounted on the rods 139, to move bodily upwardly and downwardly therewith, a sole hopper, which will now be described, referring to Figs. 10, 11, 12, and 15.

Near the left edge of the plate 143 and the cam disk 181, two of the studs 187 are extended upwardly somewhat higher than the other studs which extend merely through the members 143 and 181, and these two extended studs support a fixed bridge member 205 extending in a general direction forwardly and backwardly. Near the other or righthand edge of the members 143 and 181, two other studs 187 are similarly extended upwardly and similarly support another bridge member 207 similar to the bridge 205. Secured to these two bridge members 205 and 207 by screws 209, and supported from the bridge members by spacing washers 211, is a flat plate 213 arranged substantially horizontally and centrally apertured in line with the apertures in the plates 143 and 145 and the cam disk 181.

Sliding rightwardly and leftwardly horizontally on the top surface of the plates 213 are two slide plates, 215 at the left end and 217 at the right end of the plate 213. These sliding plates 215 and 217 carry two upstanding hopper plates. The heel hopper plate 221, curved arcuately to fit approximately the curve of the heel portion of the sole of the largest shoe to be made on the machine, is screwed to a correspondingly shaped bracket 223, which in turn is screwed on the sliding plate 215. The upstanding toe plate 225 of the hopper is similarly curved to the approximate shape of the toe of the sole of the largest sized shoe to be made on the machine, and is screwed to a bracket 227 which, in turn, is screwed to the sliding plate 217. As best seen in Fig. 15, the two hopper plates 221 and 225 have their lower edges at the same elevation, but the upper edge of the hopper heel plate 221 is considerably higher than the upper edge of the hopper toe plate 225. This is to facilitate feeding of a sole from the right side of the machine leftwardly into the hopper, over the toe plate, and to insure that the advancing heel edge of the sole will contact with the heel plate 221. If it were desired to feed the soles in from the left side of the machine instead of from the right side, the arrangement would be reversed, and the heel plate would be low, while the hopper toe plate would rise to a greater height so as to intercept the advancing soles during the horizontal feeding thereof.

The slide plates 215 and 217, on which the hopper heel and toe plates are mounted, are guided for straight line movement toward and away from each other by any suitable guiding blocks on the plate 213 on which they are supported. For example, lateral guiding blocks 231 on the front and rear sides of the slide plate 215, together with a bridge piece 233 extending across the top of the slide plate 215, are secured in fixed position on the plate 213 and thus form a guideway for the sliding movements of the plate 215. At the other end of the plate 213, a bridge piece 235 overlies the slide plate 217 and, with accompanying side blocks, serves to guide the sliding movements of the plate 217.

To equalize the movements of the two slide plates 215 and 217 so that both of them will move together inwardly toward the center of the shoe sole, or outwardly away from the center of the shoe sole, a system of equalizing levers is provided. Projecting upwardly from the slide plate 215 is a pin 241 which extends into slots in two equalizing levers 243, one overlying the other, the levers being pivoted at 245, approximately midway of their lengths, on the stationary guide blocks 231. The outer or remote ends of the levers 243 are slotted to receive pins 247 projecting upwardly from slide bars 249 which have their right ends connected to the bracket 227 which holds the hopper toe plate 22. These bars 249 slide on the top surface of the plate 213, in guideways or channels formed between stationary bars 251 secured to the upper face of the plate 213, and stationary flanges 253 secured to the front and back edges of the plate 213 and projecting upwardly therefrom. A light tension spring 255 secured at one end to a stationary pin 257 on the bridge piece 233, and at the other end to a pin 259 on a bracket 261 forming a leftward extension of the slide plate 215, serves to pull rightwardly on the slide plate 215 and thus constantly tends to move it and the hopper heel plate 221 rightwardly toward the center of the shoe sole. Through the levers 243 and bars 249, any rightward movement of the slide plate 215 causes corresponding leftward movement of the slide plate 217 through the same distance, so that the spring 255 likewise tends constantly to move the slide plate 217 and the hopper toe plate 225 leftwardly toward the center of the shoe sole. The spring 255 is a relatively light spring, having only sufficient power to overcome the frictional resistance of the parts and move the hopper toe and heel plates toward each other when nothing else interferes with such movement, but very slight pressure is sufficient to overcome the force of this spring and open the hopper plates, or move them away from each other. When a sole is fed into the hopper, from the right side of the machine, passing horizontally over the top edge of the hopper toe plate 225, the contact of the advancing heel of the sole with the hopper heel plate 221 is, in itself, sufficient to overcome the slight force of the spring 255 and move the hopper heel plate leftwardly (along with corresponding rightward movement of the hopper toe plate 225) until the hopper has opened up far enough to receive and accommodate the sole thus fed into it.

The sole then drops downwardly in the hopper, until it comes to rest in a substantially horizontal position, on the sole supporting fingers or flippers 265, four of which are provided, two of them being pivoted at 267 on the hopper heel plate 221 near its lower edge, and the other two being similarly pivoted at 267 on the hopper toe plate 225 near its lower edge. Vertical slots 269 are provided in each hopper plate to allow the fingers 265 to swing either upwardly or downwardly. Each of the sole supporting fingers 265 has its main portion projecting forwardly from the pivot 267, but has a short tail portion as seen in Figs. 13 and 15, which tail portion is connected to one end of a light coiled tension spring 271. The other end of each of the springs 271 of the fingers mounted on the hopper heel plate, is connected to the extension bracket 261 above mentioned, carried by the slide plate 215. The other end of each of the springs 271 of the fingers which are mounted on the hopper toe plate is connected to a similar bracket 273 mounted on the slide plate 217.

The springs 271 normally hold the fingers 265 in approximately horizontal position projecting inwardly toward the center of the sole, as indicated in Figs. 13 and 15. But these springs are relatively light, and although they hold the fingers sufficiently firmly to support the weight of the shoe sole itself, as indicated at 275 in Figs. 12 and 15, yet they offer very little resistance to downward movement of the shoe sole when it is forced downwardly by the sole laying plunger or ram as explained later. During the downward movement of the sole, the springs 271 stretch and the supporting fingers or flippers 265 pivot downwardly on their pivots 267, to the dotted line position shown in Fig. 14, allowing the sole 275 to pass downwardly out of the hopper. On the upward or return movement of the sole laying plunger, the fingers 265 pivot in the opposite direction on their pivots 267, moving upwardly to the full line position indicated in Fig. 14, to allow the plunger to pass upwardly.

In addition to these sole supporting fingers 265, there are also other sole supporting fingers pivotally mounted on certain of the spreading finger slide plates 151, as best seen in Figs. 6, 12, and 15. These other fingers are indicated at 281, and are each of angular form as seen best in Fig. 12, pivoted at 283 on one side of one of the slide plates 151, and having a tail 285 normally held by a tension spring 287 against a stop pin 289. When the finger is in this position against the stop pin, the main body of the finger extends approximately horizontally, crosswise of the length of the shoe sole, at an elevation slightly below the fingers 265.

Any desired number of these fingers 281 may be employed. Four are ordinarily found to be sufficient, two of them being mounted on the extreme ones of the set of parallel slide plates 151 at the front of the machine, and the other two being on the opposite sides of the corresponding slide plates 151 at the rear of the machine, as seen in Figs. 6 and 12. As the sole 275 is pressed downwardly by the pressure of the plunger or ram as described later, the downward movement of the sole turns the supporting fingers 265 as above explained, allowing the sole to pass downwardly below these fingers, until it rests on the fingers 281, and further downward pressure on the sole turns these fingers 281 on their pivots, against the tension of the spring 287, swinging the fingers downwardly until they lie approximately along the inclined cam edges 157 of the slide plates 151. The fingers 281 may be made sufficiently long to stay in this tilted position (along the inclined cam 157) until the plunger or ram moves upwardly again, or they may, if desired, be made somewhat shorter, in which case they may snap up past the edge of the plunger or ram as the latter completes its downward travel. But in the latter event, they will not interfere with the subsequent upward or restoring movement of the plunger or ram, because the operation of the machine is so timed that by the time the plunger moves upwardly, the cam disk 181 has been turned clockwise or to the right, from the position shown in Figs. 6 and 8 to the position shown in Fig. 9, whereby the inclined cam surfaces 199 of the cam disk have acted on the pins 161 of the slide plates 151 to withdraw the slide plates outwardly far enough so that the fingers 281 will clear the plunger on its upward movement.

Referring now to Figs. 1, 5, 8, and 12, the piston rod 127 extends downwardly a considerable distance below the horizontal plate 129, and is provided at its lower end with a plunger or ram 295 which is adjustable vertically on the piston rod by means of a screw shank 296 as seen in Fig. 1, and which is readily removable from the piston rod for replacement by another similar plunger or ram of different size. This plunger is carefully formed to be of the same outline and size as the sole of the shoe which is to be applied at the moment by this machine, and the plunger is removed and replaced by another plunger whenever a different size or style of shoe is to be made. The bottom surface of the plunger is hollowed out to conform with the desired curvature of the sole of the shoe, as indicated at the top of Fig. 15. As the plunger comes down during the operation of the hydraulic cylinder 123, and assuming that a shoe sole 275 has first been placed in the hopper, the plunger comes down until it contacts with the upper surface of the shoe sole 275 lying on the supporting fingers 265; then it pushes the sole down past the fingers 265, which pivot downwardly to permit such passage, whereupon the sole lies momentarily on the lower supporting fingers 281. Then the plunger continues to move the sole downwardly, displacing the fingers 281, and the downwardly advancing periphery of the sole (backed up with the solid plunger or ram) slides down the inclined cam edges 157 of the spreading finger slide plates 151, displacing these plates outwardly away from the center of the sole to the extent necessary to permit the sole to continue its downward travel. As explained later in greater detail, this outward displacement of the slide plates 151 carries the spreading fingers 175 outwardly so that the feet 179 thereon serve to spread the upstanding marginal edge of the shoe upper in an outward direction. At about the time of this outward turning of the marginal edge of the upper, or shortly afterwards, the slide plate 71 is forcibly shoved leftwardly, thus tightening the clamping or lasting plates 65, 67, and 69 to draw the shoe upper more tightly over the last and thus complete the lasting of the shoe. Just about this time, the descending sole 275 reaches the last (or the insole and upper thereon) and is pressed down firmly by the plunger 295, so that the central portion of the sole 275 comes into contact with the insole 62 and the marginal portions of the sole 275 come into contact with the outwardly and downwardly turned marginal edges of the shoe upper. Then the cam disk 181 is turned forcibly to the right or in a clockwise direction, so that the inclined cam surfaces 199 thereof act on the pins 161 to draw the spreader foot slides 151 further outwardly so that the spreader feet 179 are drawn completely out from between the shoe upper and the shoe sole, whereupon the downward pressure on the plunger or ram 295 is considerably increased, to press the sole 275 very firmly downwardly, causing it to become firmly cemented to the marginal edge of the shoe upper and to the insole, by means of cement previously applied to the sole before it is fed into the machine. This is but a brief description of the operation, to serve as a background for understanding the purpose and nature of the operating mechanism which will now be described, and the operation of the machine will be explained in greater detail later.

The sole plunger 295 is provided at one end with an upstanding arm or rod 297 for contact with one of the hopper plates after the plunger has passed downwardly below the hopper plates, to prevent the spring 255 from closing the hopper while the plunger is below it. Thus the hopper is held open whenever the plunger is below the hopper, so that the plunger can rise up again through the hopper without catching on or damaging the plunger plates.

If desired, the piston rod may be provided at any suitable point with a flexible joint or pivot, as indicated at 298, so that as the plunger descends, it may swing slightly one way or the other, to guide itself centrally in the sole hopper and centrally between the opposed cam surfaces 157.

At the right side of the machine there is a small lateral shelf 301 (Figs. 1, 3, 6, and 8) which is approximately at the elevation of the top of the last carriage. For the purpose of forcing the lasting slide 71 leftwardly at the proper moment, this shelf 301 carries a horizontally movable plunger 303 guided in a suitable guide 305 for horizontal movement in alinement with the slide 71 when the carriage is in its rear position, centered under the sole hopper and the spreading fingers. The plunger 303 carries rollers 307 on its front and rear side, and tension springs 309 tend constantly to draw the plunger rightwardly into a normal rest position in contact with the stop member or abutment 311 fixed to the shelf 301.

A pair of wedges 313 extend through an opening in the shelf 301 and straddle the plunger 303 in position to bear against the rollers 307. As these wedges 313 move downwardly, the wedging action presses the rollers 307 leftwardly, thus moving the plunger 303 leftwardly against the force of the springs 309, and the end of the plunger abuts against the slide member 71, moving this slide member leftwardly and thus forcing the clamping plates 65, 67, and 69 tightly in a closing direction.

The upper ends of the two wedge members 313 are both connected to a plate 315 (Fig. 1) which is a lateral extending bracket fixed to a rod 317 slidable vertically in fixed guides in the machine frame, and normally pressed upwardly by means of a spring 319. At its upper end, the rod 317 carries an adjusting screw 321 in position to be engaged and depressed by an arm 325 (Figs. 1–5 and 18) fixed to and extending rightwardly from the piston rod 127. At a given point in the downward movement of the piston rod (depending upon the exact adjustment of the adjusting screw 321) the arm 325 will press downwardly on the adjusting screw and thus cause downward movement of the rod 317, producing downward movement of the two wedges 313 to move the plunger 303 leftwardly to shove the slide member 71 leftwardly and thus forcibly operate the clamps 65, 67 and 69 to complete the lasting operation. When the piston 125 and piston rod 127 next move upwardly, the arm 325 moves upwardly with them, so that the spring 319 is permitted to move the rod 317 upwardly and carry with it the wedges 313, thus releasing the slide 303 which may now move rightwardly under the influence of its springs 309.

The mechanism for turning the cam disk 181 in a rightward or clockwise direction at the proper time, and then restoring it in a counterclockwise direction at the proper time, comprises a hydraulic cylinder 331 (Figs. 1, 2, 4, and 6) mounted horizontally on the rear of the machine, and containing a piston 333 connected to a piston rod 335 which extends through a suitable packing gland at the right end of the cylinder, and is there connected to an upwardly extending arm 337 which, in turn, is connected at its upper end to a horizontal slide member 339 sliding in a guideway 341 extending across the rear of the machine. This slide 339 carries two depending lugs or ears 343 and 345, somewhat spaced horizontally from each other, as seen in Figs. 2 and 6. Lying between these two lugs 343 and 345, and in the path of travel of them, is a lug 347 extending approximately radially from the rear edge of the cam disk 181.

Figure 9:
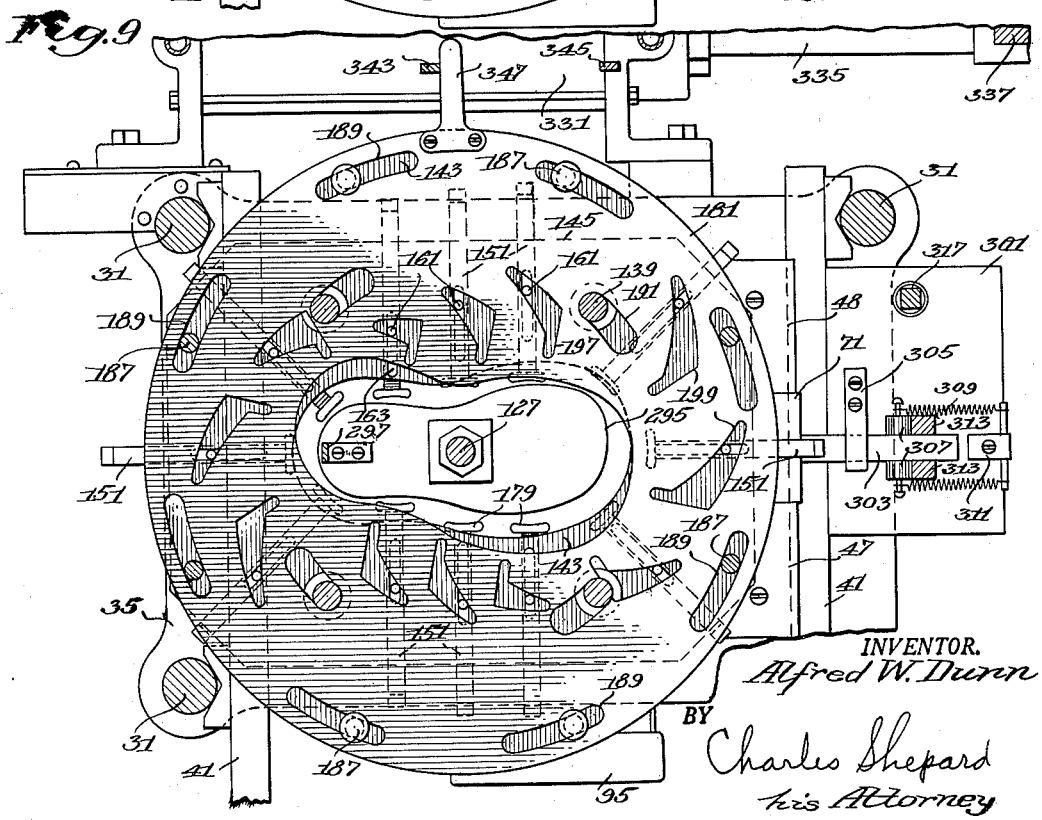
Fig. 9 is a view similar to Fig. 8, with the control cam moved to retract the spreading fingers all the way, in the final stage of a lasting operation.
Figure 18:
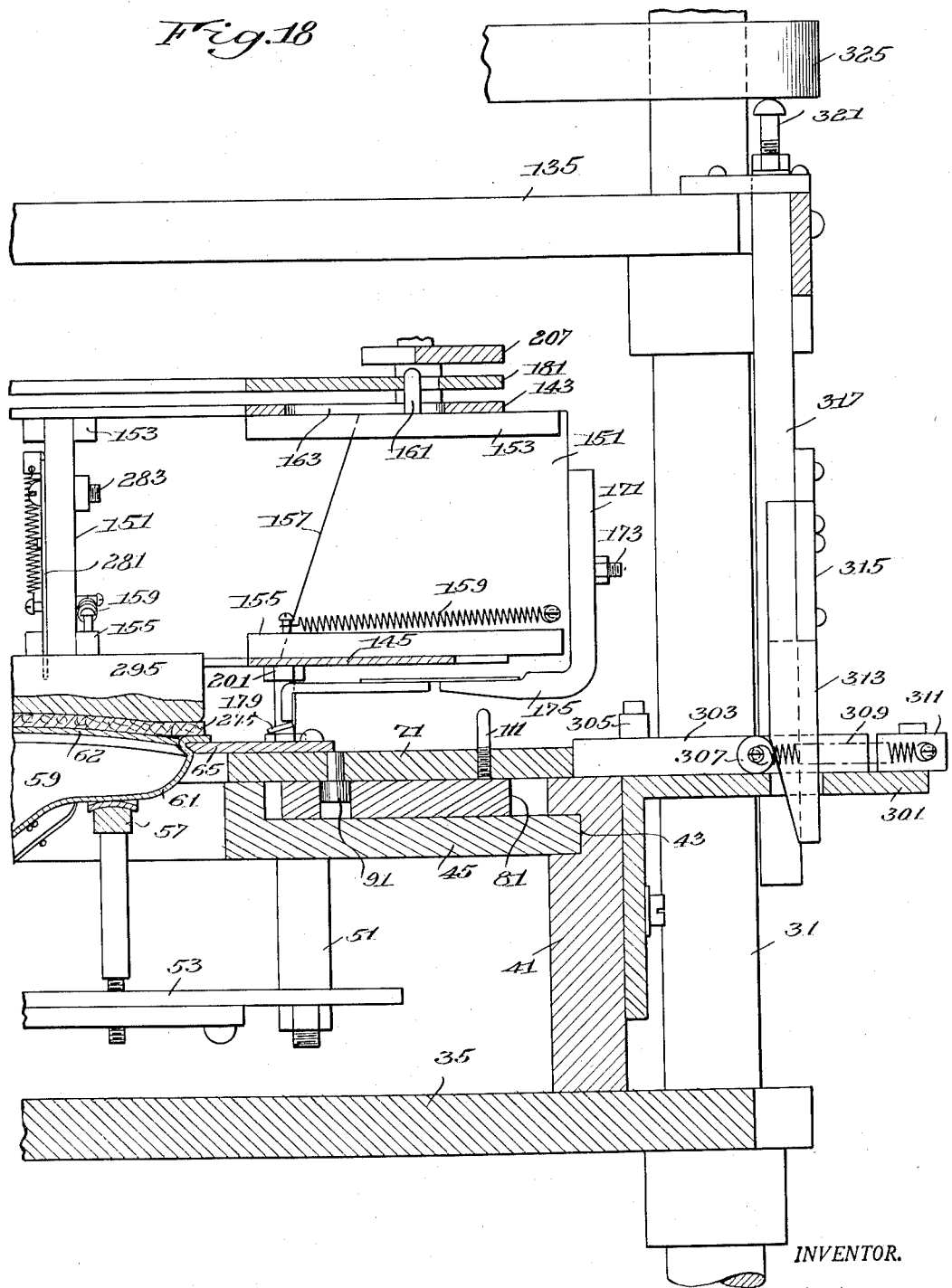
Fig. 18 is a view similar to Fig. 17, showing the next stage of the operation, with the spreading fingers completely retracted to permit the sole to engage fully with the outturned marginal edge of the upper, and completely laid thereon.

At the proper time, synchronized with the other movements of the machine, the hydraulic cylinder 331 operates to move the piston rod 335 rightwardly, thus carrying the slide 339 rightwardly and causing the lefthand lug 343 to hit against the lug 347 on the cam disk and swing it rightwardly from the position shown in Fig. 8 to the position shown in Fig. 9, thus giving the cam disk 181 the necessary clockwise rotation so that the inclined cam surfaces 199 thereof act on the pins 161 to withdraw the spreader feet 179 completely from underneath the sole which is being placed. After the placing of the sole has been completed, when the parts are being restored to their initial or rest position, the hydraulic cylinder 331 is operated in a reverse direction, which moves the lugs 343 and 345 leftwardly and then the lug 345 hits against the lug 347 on the cam disk and turns the cam disk leftwardly or in a counterclockwise direction to restore it to the initial position seen in Figs. 6 and 8.

To furnish power for operating the machine, there is provided an electric motor 351 (Figs. 1–3) resting on a shelf 353 hung by rods 357 from the horizontal shelf 35 which constitutes part of the machine frame. Through a belt 359, the motor drives a pump 361 which delivers hydraulic fluid from the tank or reservoir 39 into the main conduit 363, under considerable pressure. The principal parts of the hydraulic power system can be best understood by reference to Fig. 19, supplemented by consideration of Figs. 1–3. As is common in hydraulic power systems, there is a by-pass 365 around the pump 361, controlled by a relief valve or safety valve 367, so that excessive pressure will not be built up in the main line 363.

The line 363 leads to the main control valve 371 which is mounted on the top plate 33 of the machine and which is operated by a conveniently accessible handle 373. From the control valve 371, the conduit branches, and one branch 375 thereof leads to a spring loaded valve 377 and thence through a conduit 379 to the upper end of the hydraulic cylinder 123 which operates the main plunger or ram. Another branch from the valve 377 leads at 381 to the left end of the cylinder 331 which operates the cam disk 181.

Returning now to the main control valve 371, the other branch 385 leads from this main control valve to another spring loaded valve 387, and thence through a conduit 389 to the lower end of the cylinder 123. Another branch 391 from the valve 387 leads to the right end of the cylinder 331.

From all of these valves 371, 377, and 387, bleed conduits or return conduits 395 lead back to the reservoir or storage tank 39.

Both of the control valves 377 and 387 are of a type currently available on the open market and usually called sequence valves, directly operated, with external drain. The construction and operation of these valves are well understood by engineers acquainted with hydraulic power systems, and it is not necessary to describe them in further detail here, other than to say that when the pressure in the line 375 starts to build up, full pressure is transmitted to the line 379, but no pressure is transmitted to the line 381 until the pressure in the line 379 builds up to a predetermined amount, for which the control spring of the valve 377 is set. After the pressure in the line 379 has built up to this predetermined amount, the pressure moves the valve piston leftwardly (when viewed as in Fig. 19) against the pressure of the adjustable control spring which is built into the valve, from the position shown in Fig. 19 to the position shown in Fig. 20. When the valve piston moves leftwardly, full pressure is still transmitted from the line 375 to the line 379, but in addition thereto, pressure is now transmitted from the line 375 to the line 381. The valve 377 contains the usual conventional check valve (not shown) permitting fluid from the line 381 to drain back into the line 375 whenever the pressure in the latter is less than the pressure in the former. The other sequence valve 387 may be a duplicate of the valve 377, and operates similarly, to transmit full pressure from the line 385 to the line 389 at all times, but pressure goes from the line 385 to the line 391 only after the pressure in the line 389 builds up to a predetermined amount necessary to move the valve piston against the force of its adjustable spring.

The main control valve 371 is simply a directional control valve effective, upon operation of the handle 373, to cut off the main pressure line 363 from both of the conduits 375 and 385, or to allow pressure from the conduit 363 to enter either the line 375 or the line 385 (but not both of them) depending upon whether the handle 373 is pulled forwardly or is pushed rearwardly by the operator. As seen in Fig. 19, whenever the valve 371 is moved to connect the supply line 363 to one of the two conduits 375 and 385, the other one of these two conduits becomes automatically connected to the drain line or return line 395.

The conduit 379 leading from the sequence valve 377 to the upper end of the cylinder 123 may be provided with a pressure gauge 399 so that the operator may from time to time observe the pressure in this hydraulic line and make sure that the shoe sole is being seated firmly with the desired amount of pressure.

This completes the basic description of the individual parts of the machine. The operation of each individual part will be clear from what has been said above. A summary of the cycle of operation of the entire machine may be helpful, however, and is given at this point.

In the initial or rest position, the parts are located as indicated in Figs. 1–3, and in full lines in Fig. 5, and in Figs. 6, 12, 15, and 19. This means that the carriage 45 is in its forward position, and that the piston rod 127 of the plunger or ram cylinder 123 is in its upper position, thus holding the spreading finger assembly and the hopper assembly in their upper position.

The last loading operation and the sole loading operation are both to be performed before the machine is set into motion. It does not matter which of these two operations are performed first, and merely for convenience of description, it will be assumed that the last is to be loaded before the sole is loaded in the machine. To load the last into the machine, the operator steps on the treadle 117 which, through the link 113, produces a rightward pull on the pin 111 and shifts the slide plate 71 to the right, pulling with it the clamping plate 65 and opening up the clamping plates 67 and 69, the former moving rearwardly and the latter moving forwardly. The operator then lifts out the last 59 and the previously lasted shoe (if any) and inserts another last with a shoe upper loosely pulled over it, the last being inserted, as usual, in an inverted or upside down position and being seated on the pin 55 and the toe rest 57. The usual insole 62 has been placed on the sole of the last 59, usually before the last is mounted in the carriage of the machine, and the marginal edges of the upper 61 are left in their upstanding or erect position, as seen, for example, in Fig. 15. When the operator releases the foot pressure on the pedal 117, the spring 119 returns the pedal upwardly to its initial position, and the link 113 moves leftwardly to allow the springs 89 to push the slide member 71 leftwardly, closing the toe clamping plate 65 against the toe portion of the shoe upper and closing the clamping plates 67 and 69 against the sides of the shoe upper, at just about the level of the sole of the last.

At about this time, either before or after placing the last and upper in the carriage of the machine, the operator places a sole in the hopper of the machine, feeding it horizontally leftwardly over the top of the hopper toe plate 225, into the space between the hopper toe plate and the hopper heel plate 221. As the sole moves leftwardly, the heel edge of the sole contacts with the hopper heel plate 221 and shoves this hopper plate leftwardly against the force of the light spring 255, to open the hopper to a sufficient extent to receive the sole of this particular size. The sole then drops downwardly in the hopper until it is in the position shown at 275 in Fig. 15, resting on the supporting fingers 265. Previous to feeding the sole 275 into the hopper, the bottom face of the sole has been coated with suitable cement. Also, before placing the upper and the last in the carriage of the machine, the marginal edge of the upper which is later to receive the sole, has been coated with suitable cement, and the insole 62 has also been coated with suitable cement.

Now that the sole is positioned in the hopper, and the upper and last have been positioned in the carriage, the operator is ready to start the cycle of operation of the machine, as soon as he moves the carriage rearwardly to its lasting and sole laying position. This rearward motion is accomplished by grasping the handle 95 at the front of the carriage, and also grasping the latch bar 97 to release the latch 101—105 so it will not interfere with rearward movement of the carriage. The operator presses rearwardly on the handle 95 to slide the carriage along the rails 41 from the forward position shown in Fig. 6 to the rearward or lasting position located directly under the sole hopper and the lasting fingers, as shown in Fig. 8. When the carriage reaches this position, the latch bar 105 seats in the recess 106 in the lefthand rail 41, holding the carriage in proper position.

The operator now operates the control handle 373 moving it rearwardly to shift the valve 371 so that hydraulic pressure from the line 363 flows through the valve 371 into the line 375, and then through the sequence valve 377 to the line 379, the hydraulic fluid entering the top of the ram cylinder 123.

The hydraulic fluid flowing into the top of the cylinder 123 causes the piston 125 to start downwardly, carrying with it the piston rod 127. The first action, as the piston rod starts to descend, is that the plate 129 mounted on this piston rod comes down, and thus lowers the rods 139 which support the spreading finger assembly and the hopper assembly. Thus the spreading fingers come down from the elevated position shown in Fig. 15 to the position shown in Fig. 16 where the plate 145 rests on the supporting studs 201 and the spreading fingers 179 rest on the insole 62 under a reasonable degree of pressure produced by flexing of the spring portions 177 before the plate 145 comes to rest on the studs. The spreading fingers come down inside the upturned marginal edge of the shoe upper 61, because at this time the spreading fingers are in their compressed or innermost positions.

When the spreading fingers reach the position just described, the rods 139 stop moving downwardly, but the plate 129 and the piston rod 127 keep on moving downwardly, which is possible because of the lost motion connection between the plate 129 and the rods 139.

As the piston rod continues its descent, the plunger or ram 295, which is shaped to the outline of the sole, comes down on top of the sole 275 and pushes the sole downwardly, the supporting fingers 265 pivoting on their pivots 267 to permit the sole to descend. The downwardly moving marginal edges of the sole 275 then come in contact with the inclined cam surfaces 157 of the spreader foot slides 151, and continued downward movement of the sole and the plunger serves to move the slides 151 outwardly, carrying the spreader feet 179 outwardly with the slides. These spreader feet engage the upturned marginal edge of the shoe upper 61 and serve to turn this marginal edge outwardly and lay it down on top of the clamping plates 63, 65, 67, and 69. As the sole travels downwardly, it displaces the supporting fingers 281 which are mounted on the spreader foot slides 151, which fingers 281 aid in holding the sole level as it goes down.

As the spreading fingers 179 move outwardly, each finger may adjust itself individually upwardly or downwardly to a slight extent, by reason of the resilient spring or flexible part 177 built into each finger. When the sole 275 and plunger 295 reach the lower ends of the inclined cam surfaces 157 of the spreader foot slides 151, the outward motion of the slides stops, but the sole and the plunger continue moving downwardly until the sole lies on top of the insole 62 and on top of the now out-turned marginal edge of the upper and also on top of the spreader feet 179 which, at this time, are still lying on top of the out-turned edge of the upper in the position shown in Fig. 17.

By the time the plunger reaches this position just described, the lateral arm 325 has come down far enough to contact with the adjusting screw 321 and start the downward movement of the wedges 313, and this has caused leftward movement of the slide 303, abutting against the slide 71 on the carriage and pressing the clamping plates or lasting plates 65, 67, and 69 to a somewhat tighter position. However, the full movement of the wedges 313 has not yet occurred and the clamping plates are not yet moved to their final tight lasting position.

When the sole 275 comes to rest temporarily on the insole and the spreading feet 179 (in the position shown in Fig. 17) the piston 125 stops moving downwardly and so the hydraulic pressure starts to build up in the conduits 363, 375, and 379, because the pump 361 is, of course, still operating. When the pressure builds up to a predetermined point for which the sequence valve 377 is set (for example, a pressure of about 15 pounds to the square inch) the pressure in the conduits 375 and 379 automatically operates the sequence valve 377 to shift the valve piston from the position shown in Fig. 19 to the position shown in Fig. 20, which now allows fluid pressure to flow from the conduit 375 into the conduit 381 as well as into the conduit 379. This pressure passes to the cylinder 331 and moves the piston 333 and piston rod 335 rightwardly, so that the lug 343 controlled by this piston engages the lug 347 on the cam disk 181 and turns the cam disk in a clockwise direction from the position shown in Fig. 8 to the position shown in Fig. 9, during which movement the inclined cam surfaces 199 on the cam disk engage with the upstanding pins 161 on the spreader foot slides 151 and pull all of these spreader foot slides rapidly outwardly from the position shown in Fig. 17 to the position shown in Fig. 18, this movement serving to pull the spreader feet 179 out from between the sole 275 and the out-turned edge of the upper 61, as well seen in Fig. 18.

The piston 333 in the cylinder 331 now having reached the rightward limit of its motion, and the hydraulic fluid having no other place to escape, hydraulic pressure now builds up in the conduits 363, 375, 379, and 381 to a still greater extent, substantially in excess of the pressure at which the sequence valve 377 operated. Due partly to the now increasing pressure in the upper end of the cylinder 123, and partly to the withdrawal of the spreader feet 179 from beneath the sole 275, the piston 125 and piston rod 127 are now able to move downwardly a slight distance further, just enough to drive the wedges 313 home to their full extent of travel, giving a final push to the slides 303 and 71 and a final push to the clamping or lasting plates 65, 67, and 69, at the same time giving a final downward push under greatly increased pressure to the sole 275, to seat it more firmly on the insole 62 and the out-turned marginal edges of the upper 61. At this stage of the operation the pressure in the conduits 363, 375, and 379 may build up, for example, to a pressure in the neighborhood of 70 to 75 pounds per square inch. The pressure in the conduit 381 leading to the other cylinder 331 also builds up to the same amount, of course, but this is immaterial in the operation of the machine, the important thing being the increasing pressure in the main plunger cylinder 123. The ultimate pressure which is built up in the conduit 379 and cylinder 123 depends, of course, on the setting of the relief valve 367.

The moment this high pressure is built up in the cylinder 123, the lasting and sole placing operation is completed. It is not necessary to hold the pressure for any appreciable length of time, the mere building up of the pressure to the desired amount being all that is needed, and it may then be immediately released, for restoring the machine parts to their initial or rest position. This is done by the operator moving the control handle 373 in the opposite direction, for example pulling it forwardly, which reverses the position of the valve 371, and allows the hydraulic fluid from the conduit 375 to flow back to the reservoir 39 through the return conduit 395, while connecting the main pressure conduit 363 through the valve 371 to the conduit 385 leading to the second sequence valve 387. The operation of this sequence valve 387 is such that, at first, the hydraulic fluid flows only to the conduit 389 leading to the plunger cylinder 123, and does not flow through the conduit 391 to the cam cylinder 331. Consequently, the first thing that happens is that hydraulic fluid enters the lower part of the cylinder 123, and raises the piston 125 and piston rod 127, to pull upwardly on the plunger 295, which rises up from the sole 275, leaving the sole, of course, cemented to the insole and upper on the shoe last. At the time that the plunger rises, the cam disk 181 remains in its position shown in Fig. 9, holding the spreader foot slides in their outermost positions, so that at this time there is no interference of the pressure feet or the pressure foot slides with the upward motion of the plunger or ram, and preferably the sole supporting fingers 281 on the spreader foot slides are sufficiently short so that they readily clear the plunger during its upward movement. The arm 297 mounted on the plunger holds the hopper heel plate 221 from closing under the influence of its spring 225 while the plunger is below the hopper, and the connection 243, 249 between the hopper heel plate and the hopper toe plate likewise keeps the hopper toe plate out of the way in open position.

As the plunger comes up above the bottom of the hopper, the spring 255 is allowed to close the hopper. As the plunger approaches the top of its motion, the plate 129 on the piston rod picks up the rods 139 which support the spreader foot assembly and the hopper assembly and lifts these rods so as to raise the spreader feet and the hopper a slight distance (for example, about one inch) above the top of the shoe last. Then when the plunger and the piston 125 finally reach the extreme upward limit of their motion, the pressure in the conduits 385 and 389 begins to build up because the piston 125 is no longer moving, and when the pressure builds up to a predetermined point for which the sequence valve 387 is set, this valve operates in a manner similar to that in which the first sequence valve 377 operated, and hydraulic pressure may now flow through the sequence valve to the conduit 391 leading to the righthand side of the cam controlling cylinder 331. This moves the piston 333 leftwardly, carrying the lugs 343 and 345 leftwardly, during which movement the lug 345 contacts with the lug arm 347 on the cam disk 181 and turns the cam disk back in a counterclockwise direction from the position shown in Fig. 9 to the initial position shown in Fig. 8. This releases the pins 161 from the cam surfaces 199 of the cam disk, and allows the springs 159 of the spreader foot slides 151 to move the spreader foot slides back towards the center, to their initial or rest position shown in Figs. 12 and 15.

While this upward movement of the plunger and the piston rod 127 have been going on, the lateral arm 325 has, of course, risen with the piston rod, and has released the adjusting screw 321 on the rod 317, so that the spring 319 of this rod has raised the wedges 313 which allows the springs 311 to move the slide 303 rightwardly, out of contact with the slide 71 on the carriage.

The hydraulically controlled parts have now been restored to their initial or rest position. The operator then grasps the latch lever 97 on the handle 95 of the carriage, and pulls forwardly so as to pull the latch rod 101 to the right and release the latching end 105 thereof from the recess 106 in the guide rail 41. Then he pulls the carriage forwardly along the guide rails 41 until it is in an accessible position at the front of the machine. As the carriage reaches its forward position, the pin 111 on the slide 71 of the carriage enters the notch 112 in the link 113. During this movement of the carriage, the springs 89 on the carriage have held the clamping and lasting plates 65, 67, and 69 in their closed position, but these springs 89 are only light springs and do not hold the lasting plates with anything like the high pressure which was used in the actual lasting operation, and which was produced by the wedges 313 acting on the slide 303. The operator now steps on the treadle 117 which moves the link 113 to the right and, since the pin 111 is now caught in the notch 112, this moves the pin 111 to the right, carrying the slide 71 rightwardly with it and thus opening up and releasing the clamping and lasting plates 65, 67, and 69.

The operator now lifts out the last and the lasted shoe with the sole laid thereon, places another last and upper and insole thereon in the carriage, feeds another sole into the hopper, and is ready to repeat the cycle of operation to last the next shoe and place the sole thereon.

When shoes of a different size are to be made, the fixed lasting plate 63 and the movable lasting plates 65, 67, and 69 may be removed by removing the screws 107 which hold them in place, and may be replaced by other similar plates of the proper size for the new size of shoe which is to be made. The other plates may be quickly positioned where desired because of the use of the dowel pins 109 which serve to hold these plates in proper position. Slight differences in size of the shoe do not always require replacement of the lasting plates, but for any substantial difference in size, new plates, properly shaped for the new size of shoe, should be employed. Also, for any substantial difference in size of shoe, and preferably for any difference whatever in size or shape of the shoe, a new plunger or ram 295 is secured to the lower end of the piston rod 127. No other parts of the machine need be changed for lasting different sizes of shoes, within reasonable limits of sizes which the machine is intended to accommodate.

From the foregoing description, those skilled in this art will readily recognize that the foregoing machine is extremely fast and efficient in operation. A battery of two machines may be set up side by side, one for right foot shoes and the other for left foot shoes of the same size and style, and a single operator can usually operate both machines efficiently, without difficulty. He loads one machine, for example the right shoe machine, while the other machine is automatically performing the hydraulically controlled sequence of operations. Then about the time that he finishes loading the right foot machine, the left foot machine has finished the lasting and sole laying operation. Then the operator moves the control lever of the left foot machine to start the parts in the reverse or restoring direction, and this machine is restored to initial position by the hydraulic mechanism while the operator moves the carriage rearwardly on the first or right machine and starts it in operation. Then while this machine is going through its cycle of lasting and sole placing operation, the operator pulls the carriage forwardly on the second or left machine, unloads it, and loads it for the next operation, by which time the first machine has finished its lasting operation and the operator starts it in a reverse direction and then starts the second machine in its lasting cycle. In this way a single operator can work with two machines set closely side by side, in a very efficient manner with practically no lost motion or lost time, the production rate being relatively high.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. A shoe lasting machine including means for holding a last with an upper thereon, a plunger mounted for movement toward said last, and a sole hopper for holding a sole in a stationary position between said plunger and said last and alined with both said plunger and said last so that the advancing plunger will contact with said sole and move said sole out of said hopper toward said last and then press said sole against said last.

2. A shoe lasting machine including means for holding a last with an upper thereon, a plunger mounted for movement toward said last, a sole hopper for holding a sole in a stationary position between said plunger and said last and alined with both said plunger and said last so that the advancing plunger will contact with said sole and move said sole out of said hopper toward said last and then press said sole against said last, and means for operating said plunger to press said sole against said last initially with a relatively low degree of pressure and thereafter to press said sole against said last with a relatively high degree of pressure.

3. A machine as described in claim 2, in which said means for operating said plunger is hydraulic means.

4. A shoe lasting machine including means for holding a last with an upper thereon and with marginal edges of the upper in upstanding position, a plunger mounted for movement toward said last, a sole hopper for holding a sole in a stationary position between said plunger and said last and alined with both said plunger and said last so that the advancing plunger will contact with said sole and move said sole out of said hopper toward said last and then press said sole against said last, and a plurality of spreading fingers for turning the marginal edges of the upper outwardly and downwardly to a position ready to receive the sole.

5. A shoe lasting machine including means for holding a last with an upper thereon and with marginal edges of the upper in upstanding position, a plunger mounted for movement toward said last, a sole hopper for holding a sole in a predetermined position between said plunger and said last so that as said plunger advances toward said sole it will contact with said sole and move said sole out of said hopper toward said last and then press said sole against said last, and a plurality of spreading fingers operating in timed relation to the movement of the sole toward the last, for turning the marginal edges of the upper to a position ready to receive the sole.

6. A shoe lasting machine including means for holding a last with an upper thereon and with marginal edges of the upper in upstanding position, a plunger mounted for movement toward said last, a sole hopper for holding a sole in a predetermined position between said plunger and said last so that as said plunger advances toward said sole it will contact with said sole and move said sole out of said hopper toward said last and then press said sole against said last, and a plurality of spreading fingers operated by movement of said sole and plunger toward said last, for spreading the marginal edges of the upper to a position ready to receive the sole.

7. A shoe lasting machine including a plunger movable approximately vertically, means for supporting a shoe sole in approximately horizontal position beneath said plunger when said plunger is in an upper position, said supporting means being yieldable to allow a sole supported thereby to move downwardly when downward pressure is exerted on said sole by said plunger, a series of spreading fingers having effective ends lying below a sole when supported by said means and mounted for approximately horizontal movement in directions generally outwardly from positions inside the outline of said sole to positions outside the outline thereof, and means for holding a last beneath said effective ends of said spreading fingers in such position that a shoe upper on said last may have upturned marginal portions in position to be spread outwardly by said effective ends of said spreading fingers and to receive a sole moved downwardly onto the last by downward movement of said plunger.

8. A construction as described in claim 7, further including a last-supporting carriage movable approximately horizontally from a loading position in which a last supported thereby is horizontally offset from said plunger, to an operating position in which said last is substantially vertically alined with said plunger.

9. A shoe lasting machine including a frame, a last holding carriage movable relative to said frame from a last loading position to a sole applying position, lasting members movably mounted on said carriage for engaging an upper on a last held in said carriage to draw the upper tightly on the last, means for shifting said lasting members to a released position when said carriage is in loading position and means for clamping said lasting members tightly in lasting position when said carriage is in sole applying position.

10. A shoe lasting machine including a frame, a last holding carriage movable relative to said frame from a last loading position to a sole applying position, lasting members movably mounted on said carriage for engaging an upper on a last held in said carriage to draw the upper tightly on the last, a movable member on said carriage for controlling movements of said lasting members, means at one point on said frame for engaging said movable member when said carriage is in loading position to shift said lasting members to a released position, and other means at another point on said frame for engaging said movable member when said carriage is in sole applying position to operate said movable member to clamp said lasting members tightly against the shoe upper.

11. Shoe lasting mechanism including means for holding a last having thereon an upper with upstanding marginal edges, a plurality of lasting members movable to press inwardly on the exterior surface of said upper at approximately the level of the sole portion of the last, a plurality of spreading fingers movable at approximately the level of the sole portion of the last from positions inside the upstanding marginal edges of the upper in directions outwardly from such positions to spread said upstanding marginal edges and fold them down and outwardly, and means for moving said lasting members inwardly and concomitantly moving said spreading fingers outwardly.

12. Shoe lasting mechanism including means for holding a last having thereon an upper with upstanding marginal edges, a plurality of lasting members movable to press inwardly on the exterior surface of said upper at approximately the level of the sole portion of the last, a plurality of spreading fingers movable at approximately the level of the sole portion of the last from positions inside the upstanding marginal edges of the upper in directions outwardly from such positions to spread said upstanding marginal edges and fold them down and outwardly, and hydraulic power means for moving said lasting members inwardly and concomitantly moving said spreading fingers outwardly.

13. Shoe lasting mechanism including means for holding a last having thereon an upper with upstanding marginal edges, a plurality of lasting members movable to press inwardly on the exterior surface of said upper at approximately the level of the sole portion of the last, a plurality of spreading fingers movable at approximately the level of the sole portion of the last from positions inside the upstanding marginal edges of the upper in directions outwardly from such positions to spread said upstanding marginal edges and fold them down and outwardly, means for holding a sole in a position centered over said last and upper, and means for urging said lasting members inwardly and concomitantly moving said spreading fingers outwardly and seating said sole with moderate pressure on the out-turned marginal edges of said upper while portions of said fingers remain interposed between said marginal edges and said sole, and means for withdrawing said portions of said fingers from between said marginal edges and said sole and thereafter increasing the pressure of seating said sole against said marginal edges.

14. Shoe lasting mechanism including a ram movable along a substantially straight axis, means for holding a shoe sole approximately transverse to said axis and approximately centered with respect thereto, a spreader assembly mounted for bodily movement in the direction of said axis, said assembly including a plurality of spreader members individually movable inwardly toward said axis and outwardly away from said axis, means for holding a last with the sole portion thereof extending approximately transverse to said axis and approximately centered with respect thereto and with a shoe upper mounted on said last and having upstanding marginal edges, and means for moving said ram longitudinally along said axis toward said last to contact with said sole and move said sole toward said last and concomitantly moving said spreader assembly toward said last until the spreader members thereof are substantially in contact with said last and then moving the spreader members thereof outwardly away from said axis to turn the upstanding marginal edge of said upper outwardly and downwardly preparatory to receiving said sole.

15. A construction as described in claim 14 in which the spreader members are moved outwardly away from said axis by means which includes cam means operated by said sole as it moves toward said last.

16. A construction as described in claim 14 in which the spreader members are moved outwardly away from said axis by means which includes an indivadual cam operatively connected to each of said spreader members and lying in the path of travel of the sole as the sole moves toward said last, to be displaced thereby.

17. A construction as described in claim 14 in which the spreader members are moved outwardly away from said axis by means which includes cam means operated by movement of said sole toward said last for moving said spreader members part way outwardly from said axis, and other cam means for moving said spreader members an additional distance outwardly away from said axis.

18. A machine for operating upon shoes, including means for holding a last with a shoe upper mounted thereon and having an upstanding marginal edge, a spreader assembly including a series of spreader members movable in general directions inwardly toward the center of said assembly and outwardly away from said center, said assembly being mounted for bodily movement to carry said spreader members relatively close to and farther away from the sole portion of said last, means for moving each spreader member outwardly away from said center while said spreader members are close to the sole portion of said last, to a position in which the inner end of the spreader member overlies said marginal edge of said upper and holds said marginal edge turned outwardly and downwardly preparatory to receiving a sole, and other means for moving each of said spreader members further outwardly away from said center to a position beyond the downturned marginal edge of said upper.

19. A machine for operating upon shoes, including a plunger movable along an axis, means for holding a last in a position with its sole portion approximately in line with said axis, and a sole hopper for holding a sole in a stationary position approximately in line with said axis and between said last and said plunger, so that as said plunger moves along said axis toward said last it will engage a sole held in said hopper and will carry said sole toward said last.

20. A construction as deescribed in claim 19, in which said sole hopper includes a wall for engaging one edge of a sole, a wall for engaging an opposite edge of a sole, and resilient means tending to move said walls toward each other.

21. A construction as described in claim 20, further including a displaceable finger mounted on each of said walls and projecting inwardly to underlie a sole held in said hopper between said walls.

22. A construction as described in claim 19, in which said sole hopper is mounted for bodily movement toward and away from said last.

23. A construction as described in claim 19, in which said last holding means is mounted on a carriage movable in a direction approximately transverse to said axis.

24. A construction as described in claim 19, in which said last holding means is mounted on a carriage, and in which said carriage is movable in a direction approximately transverse to said axis to carry said last holding means from an operating position approximately alined with said axis to a loading position substantially offset from said axis.

25. A machine for operating upon shoes, including a ram movable along an axis, means for holding a last substantially alined with said axis, said last being adapted to receive an insole and a shoe upper with upstanding marginal edges, a spreader assembly substantially centered on said axis in overlying relation to said last and including a series of spreader members having effective ends movable outwardly from positions relatively close to said axis to positions farther from said axis, said spreader assembly being bodily movable substantially in the direction of said axis to carry said effective ends, when relatively close to said axis, from positions spaced above an insole on said last to positions substantially in contact with such insole, and operating means effective in timed sequence for moving said ram toward said last, moving said spreader assembly toward said last until said effective ends of said spreader members are substantially in contact with an insole on said last, moving said effective ends outwardly away from said axis for a sufficient distance to turn the upstanding marginal edges of the upper outwardly and downwardly and to overlie the downturned marginal edges to hold them in downturned position, moving said ram to apply pressure to a sole interposed between said insole and said ram, moving said effective ends farther outwardly to positions beyond the downturned marginal edges, and thereafter increasing the pressure applied by said ram to said sole.

26. A construction as described in claim 25, in which said operating means includes hydraulic power means.

27. A construction as described in claim 25, in which said operating means includes a first hydraulic power cylinder for moving said ram and causing the first mentioned outward movement of the effective ends of said spreader members, and a second hydraulic power cylinder for causing the second mentioned outward movement of said effective ends.

28. A construction as described in claim 27, further including a hydraulic sequence valve operated by the hydraulic pressure applied to said first hydraulic cylinder, for controlling application of hydraulic pressure to said second hydraulic cylinder.

References Cited in the file of this patent

UNITED STATES PATENTS

| | | |
|---|---|---|
| 2,132,440 | Rohrer | Oct. 11, 1938 |
| 2,239,737 | Rohrer | Apr. 29, 1941 |
| 2,246,748 | Miller | June 24, 1941 |
| 2,249,635 | Newcomb | July 15, 1941 |
| 2,294,315 | Miller | Aug. 25, 1942 |
| 2,331,348 | Rohrer | Oct. 12, 1943 |
| 2,356,241 | Holmgren | Aug. 22, 1944 |
| 2,468,222 | Miller | Apr. 26, 1949 |